US007169316B1

(12) United States Patent
Silverbrook

(10) Patent No.: US 7,169,316 B1
(45) Date of Patent: *Jan. 30, 2007

(54) METHOD OF MANUFACTURE OF AN INK JET PRINTHEAD HAVING A MOVING NOZZLE WITH AN EXTERNALLY ARRANGED ACTUATOR

(75) Inventor: Kia Silverbrook, Balmain (AU)

(73) Assignee: Silverbrook Research Pty Ltd, Balmain (AU)

(*) Notice: Subject to any disclaimer, the term of this patent is extended or adjusted under 35 U.S.C. 154(b) by 0 days.

This patent is subject to a terminal disclaimer.

(21) Appl. No.: 10/296,435

(22) PCT Filed: May 24, 2000

(86) PCT No.: PCT/AU00/00579

§ 371 (c)(1), (2), (4) Date: Aug. 1, 2003

(87) PCT Pub. No.: WO01/89840

PCT Pub. Date: Nov. 29, 2001

(51) Int. Cl.
*G01D 15/00* (2006.01)
*G11B 5/127* (2006.01)
*B21D 53/76* (2006.01)
*B23P 17/00* (2006.01)

(52) U.S. Cl. ........................................ 216/27; 29/890.1

(58) Field of Classification Search ..................... None
See application file for complete search history.

(56) References Cited

U.S. PATENT DOCUMENTS 4,633,267 A 12/1986 Meinhof
5,828,394 A 10/1998 Khuri-Yakub et al.
6,180,427 B1 1/2001 Silverbrook
6,228,668 B1 5/2001 Silverbrook

FOREIGN PATENT DOCUMENTS

EP 0416540 A2 3/1991
EP 0738600 A2 10/1996
JP 08067005 A 5/1996
JP 11348311 A 12/1999
WO WO 98/18633 A1 5/1998
WO WO 99/03680 A1 1/1999
WO WO 9903681 A1 * 1/1999

* cited by examiner

*Primary Examiner*—Parviz Hassanzadeh
*Assistant Examiner*—Roberts Culbert

(57) ABSTRACT

A method of manufacture of an ink jet printhead includes the steps of providing a substrate (16). An array of nozzle assemblies (10) is created on the substrate with a nozzle chamber (34) in communication with a nozzle opening (24) of a nozzle (22) of each nozzle assembly (24). The nozzle (22) of each assembly (10) is displaceable relative to the substrate (16) for effecting ink ejection on demand and the nozzle assembly (1) includes an actuator unit (28) connected to the nozzle (22) and arranged externally of the chamber (34) for controlling displacement of the nozzle (22).

7 Claims, 27 Drawing Sheets

METHOD OF MANUFACTURE OF AN INK JET PRINTHEAD HAVING A MOVING NOZZLE WITH AN EXTERNALLY ARRANGED ACTUATOR

The present application is a which is a 371 of PCT/AU02/00065 filed on Jan. 22, 2002, the entire contents of which are herein incorporated by reference.

FIELD OF THE INVENTION

This invention relates to ink jet printheads. More particularly, the invention relates to a method of manufacture of an inkjet printhead having a moving nozzle with an externally arranged actuator.

CO-PENDING APPLICATIONS

Various methods, systems and apparatus relating to the present invention are disclosed in the following co-pending applications filed by the applicant or assignee of the present invention simultaneously with the present application:

PCT/AU00/00518, PCT/AU00/00519, PCT/AU00/00520, PCT/AU00/00521, PCT/AU00/00522, PCT/AU00/00523, PCT/AU00/00524, PCT/AU00/00525, PCT/AU00/00526, PCT/AU00/00527, PCT/AU00/00528, PCT/AU00/00529, PCT/AU00/00530, PCT/AU00/00531, PCT/AU00/00532, PCT/AU00/00533, PCT/AU00/00534, PCT/AU00/00535, PCT/AU00/00536, PCT/AU00/00537, PCT/AU00/00538, PCT/AU00/00539, PCT/AU00/00540, PCT/AU00/00541, PCT/AU00/00542, PCT/AU00/00543, PCT/AU00/00544, PCT/AU00/00545, PCT/AU00/00547, PCT/AU00/00546, PCT/AU00/00554, PCT/AU00/00556, PCT/AU00/00557, PCT/AU00/00558, PCT/AU00/00559, PCT/AU00/00560, PCT/AU00/00561, PCT/AU00/00562, PCT/AU00/00563, PCT/AU00/00564, PCT/AU00/00565, PCT/AU00/00566, PCT/AU00/00567, PCT/AU00/00568, PCT/AU00/00569, PCT/AU00/00570, PCT/AU00/00571, PCT/AU00/00572, PCT/AU00/00573, PCT/AU00/00574, PCT/AU00/00575, PCT/AU00/00576, PCT/AU00/00577, PCT/AU00/00578, PCT/AU00/00579, PCT/AU00/00581, PCT/AU00/00580, PCT/AU00/00582, PCT/AU00/00587, PCT/AU00/00588, PCT/AU00/00589, PCT/AU00/00583, PCT/AU00/00593, PCT/AU00/00590, PCT/AU00/00591, PCT/AU00/00592, PCT/AU00/00584, PCT/AU00/00585, PCT/AU00/00586, PCT/AU00/00594, PCT/AU00/00595, PCT/AU00/00596, PCT/AU00/00597, PCT/AU00/00598, PCT/AU00/00516, PCT/AU00/00517, PCT/AU00/00511, PCT/AU00/00501, PCT/AU00/00502, PCT/AU00/00503, PCT/AU00/00504, PCT/AU00/00505, PCT/AU00/00506, PCT/AU00/00507, PCT/AU00/00508, PCT/AU00/00509, PCT/AU00/00510, PCT/AU00/00512, PCT/AU00/00513, PCT/AU00/00514, PCT/AU00/00515

The disclosures of these co-pending applications are incorporated herein by cross-reference.

BACKGROUND TO THE INVENTION

Our co-pending U.S. patent application Ser. No. 09/112,835 discloses a method of manufacture of a moving nozzle generally. Such a moving nozzle device is actuated by means of a magnetically responsive device for effecting displacement of the moving nozzle and, in so doing, to effect ink ejection.

A problem with this arrangement is that it is required that parts of the device be hydrophobically treated to inhibit the ingress of ink into the region of the actuator.

A method of manufacture of a moving nozzle-type device is proposed where the need for hydrophobic treatment is obviated.

SUMMARY OF THE INVENTION

According to the invention, there is provided a method of manufacture of an ink jet printhead, the method including the steps of:— providing a substrate; and creating an array of nozzle assemblies on the substrate with a nozzle chamber in communication with a nozzle opening of a nozzle of each nozzle assembly, the nozzle of each assembly being displaceable relative to the substrate for effecting ink ejection on demand and the nozzle assembly including an actuator unit connected to the nozzle and arranged externally of the chamber for controlling displacement of the nozzle.

In this specification, the term “nozzle” is to be understood as an element defining an opening and not the opening itself.

Preferably, the method includes creating said array by using planar monolithic deposition, lithographic and etching processes.

Further, the method may include forming multiple printheads simultaneously on the substrate.

The method may include forming integrated drive electronics on the same substrate. The integrated drive electronics may be formed using a CMOS fabrication process.

The method may include forming a first part of a wall defining the chamber from a part of the nozzle and a second part of the wall from an inhibiting means, which inhibits leakage of ink from the chamber, the inhibiting means extending from the substrate. More particularly, the method may include, by deposition and etching processes, forming the inhibiting means to extend from the substrate.

The method may include interconnecting the nozzle and the actuator unit by means of an arm such that the nozzle is cantilevered with respect to the actuator unit.

The actuator unit may be a thermal bend actuator and the method may include forming the actuator from at least two beams, one being an active beam and the other being a passive beam. By “active” beam is meant that a current is caused to pass through the active beam for effecting thermal expansion thereof. In contrast, the “passive” beam, has no current flow therethrough and serves to facilitate bending of the active beam, in use.

BRIEF DESCRIPTION OF THE DRAWINGS

The invention is now described by way of example with reference to the accompanying diagrammatic drawings in which:—

DETAILED DESCRIPTION OF THE DRAWINGS

Figure 1:
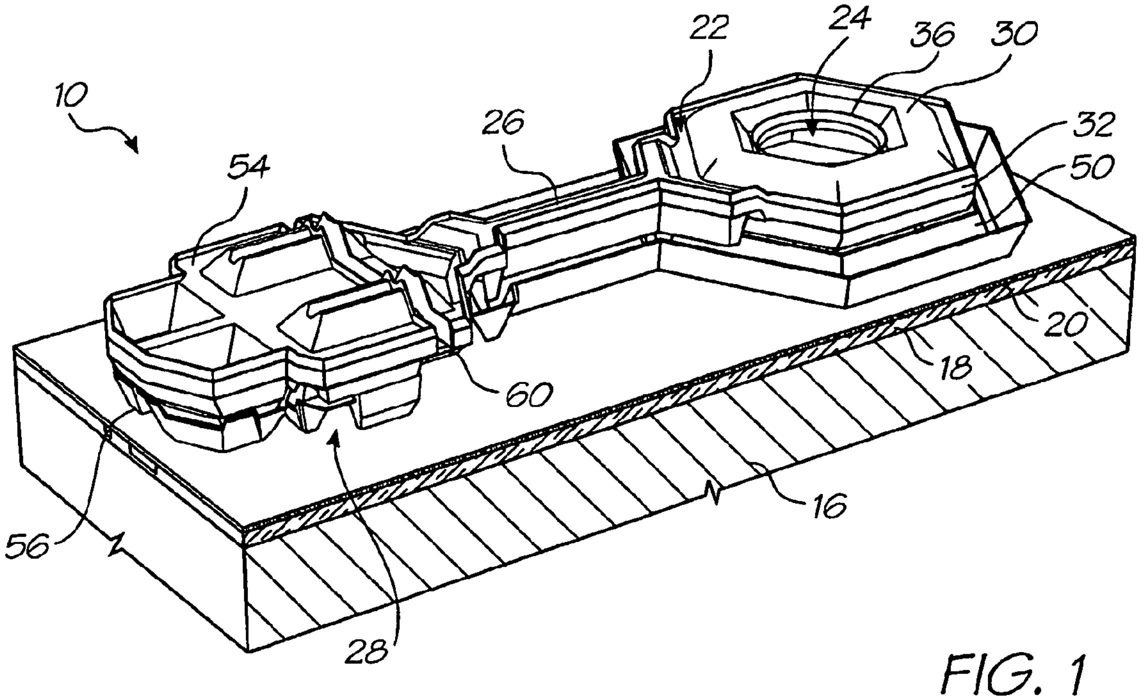
FIG. 1 shows a three dimensional, schematic view of a nozzle assembly for an ink jet printhead.

Referring initially to FIG. 1 of the drawings, a nozzle assembly, in accordance with the invention is designated generally by the reference numeral 10. An ink jet printhead has a plurality of nozzle assemblies 10 arranged in an ink array 14 (FIGS. 5 and 6) on a silicon substrate 16. The array 14 will be described in greater detail below.

The assembly 10 includes a silicon substrate or wafer 16 on which a dielectric layer 18 is deposited. A CMOS passivation layer 20 is deposited on the dielectric layer 18.

Each nozzle assembly 12 includes a nozzle 22 defining a nozzle opening 24, a connecting member in the form of a lever arm 26 and an actuator 28. The lever arm 26 connects the actuator 28 to the nozzle 22.

Figure 2:
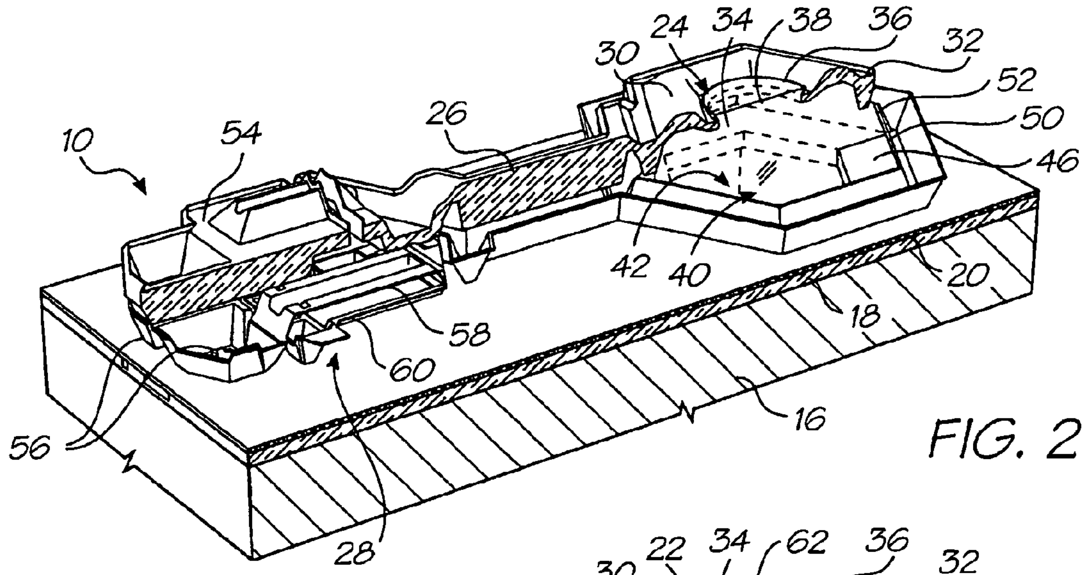
FIGS. 2 to 4 show a three dimensional, schematic illustration of an operation of the nozzle assembly of FIG. 1.
Figure 3:
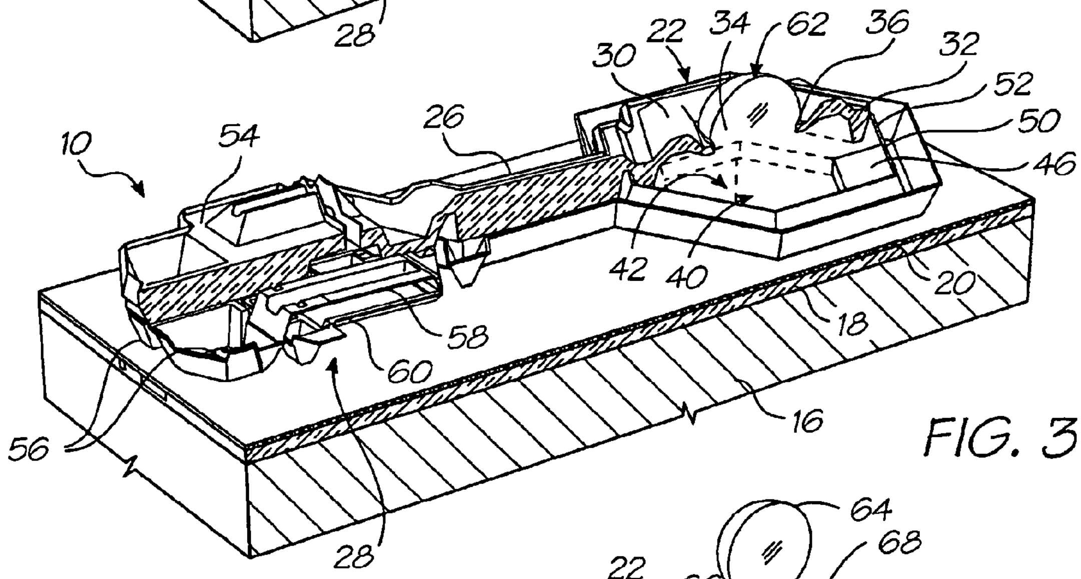
Figure 4:
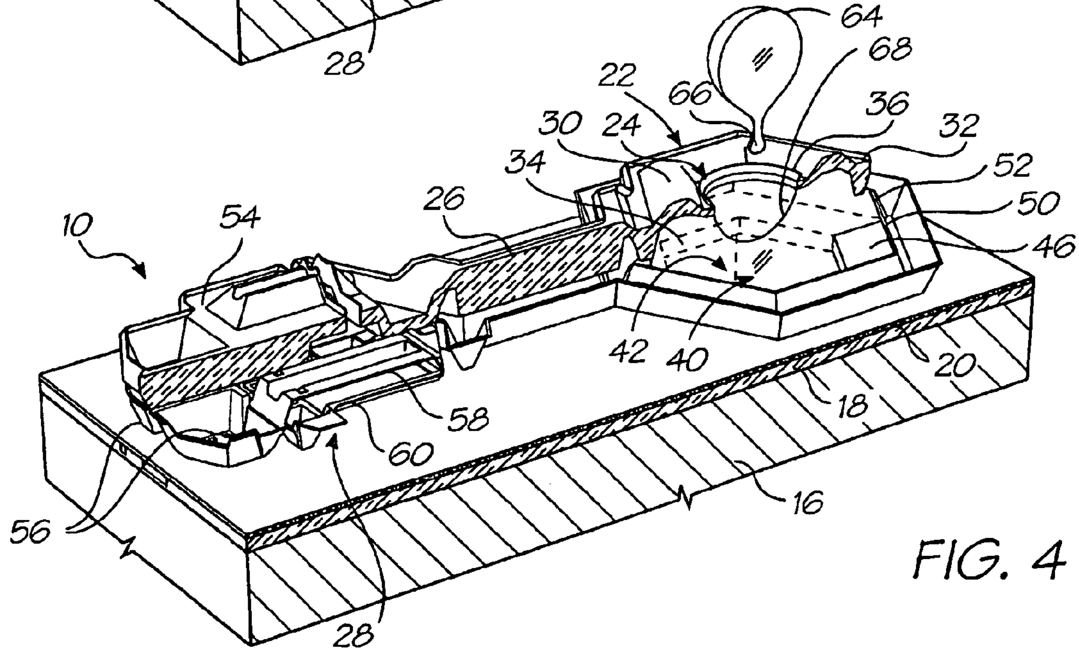

As shown in greater detail in FIGS. 2 to 4 of the drawings, the nozzle 22 comprises a crown portion 30 with a skirt portion 32 depending from the crown portion 30. The skirt portion 32 forms part of a peripheral wall of a nozzle chamber 34 (FIGS. 2 to 4 of the drawings). The nozzle opening 24 is in fluid communication with the nozzle chamber 34. It is to be noted that the nozzle opening 24 is surrounded by a raised rim 36 which "pins" a meniscus 38 (FIG. 2) of a body of ink 40 in the nozzle chamber 34.

An ink inlet aperture 42 (shown most clearly in FIG. 6 of the drawing) is defined in a floor 46 of the nozzle chamber 34. The aperture 42 is in fluid communication with an ink inlet channel 48 defined through the substrate 16.

A wall portion 50 bounds the aperture 42 and extends upwardly from the floor portion 46. The skirt portion 32, as indicated above, of the nozzle 22 defines a first part of a peripheral wall of the nozzle chamber 34 and the wall portion 50 defines a second part of the peripheral wall of the nozzle chamber 34.

The wall 50 has an inwardly directed lip 52 at its free end which serves as a fluidic seal which inhibits the escape of ink when the nozzle 22 is displaced, as will be described in greater detail below. It will be appreciated that, due to the viscosity of the ink 40 and the small dimensions of the spacing between the lip 52 and the skirt portion 32, the inwardly directed lip 52 and surface tension function as an effective seal for inhibiting the escape of ink from the nozzle chamber 34.

The actuator 28 is a thermal bend actuator and is connected to an anchor 54 extending upwardly from the substrate 16 or, more particularly from the CMOS passivation layer 20. The anchor 54 is mounted on conductive pads 56 which form an electrical connection with the actuator 28.

The actuator 28 comprises a first, active beam 58 arranged above a second, passive beam 60. In a preferred embodiment, both beams 58 and 60 are of, or include, a conductive ceramic material such as titanium nitride (TiN).

Both beams 58 and 60 have their first ends anchored to the anchor 54 and their opposed ends connected to the arm 26. When a current is caused to flow through the active beam 58 thermal expansion of the beam 58 results. As the passive beam 60, through which there is no current flow, does not expand at the same rate, a bending moment is created causing the arm 26 and, hence, the nozzle 22 to be displaced downwardly towards the substrate 16 as shown in FIG. 3 of the drawings. This causes an ejection of ink through the nozzle opening 24 as shown at 62 in FIG. 3 of the drawings. When the source of heat is removed from the active beam 58, i.e. by stopping current flow, the nozzle 22 returns to its quiescent position as shown in FIG. 4 of the drawings. When the nozzle 22 returns to its quiescent position, an ink droplet 64 is formed as a result of the breaking of an ink droplet neck as illustrated at 66 in FIG. 4 of the drawings. The ink droplet 64 then travels on to the print media such as a sheet of paper. As a result of the formation of the ink droplet 64, a "negative" meniscus is formed as shown at 68 in FIG. 4 of the drawings. This "negative" meniscus 68 results in an inflow of ink 40 into the nozzle chamber 34 such that a new meniscus 38 (FIG. 2) is formed in readiness for the next ink drop ejection from the nozzle assembly 10.

Figure 5:
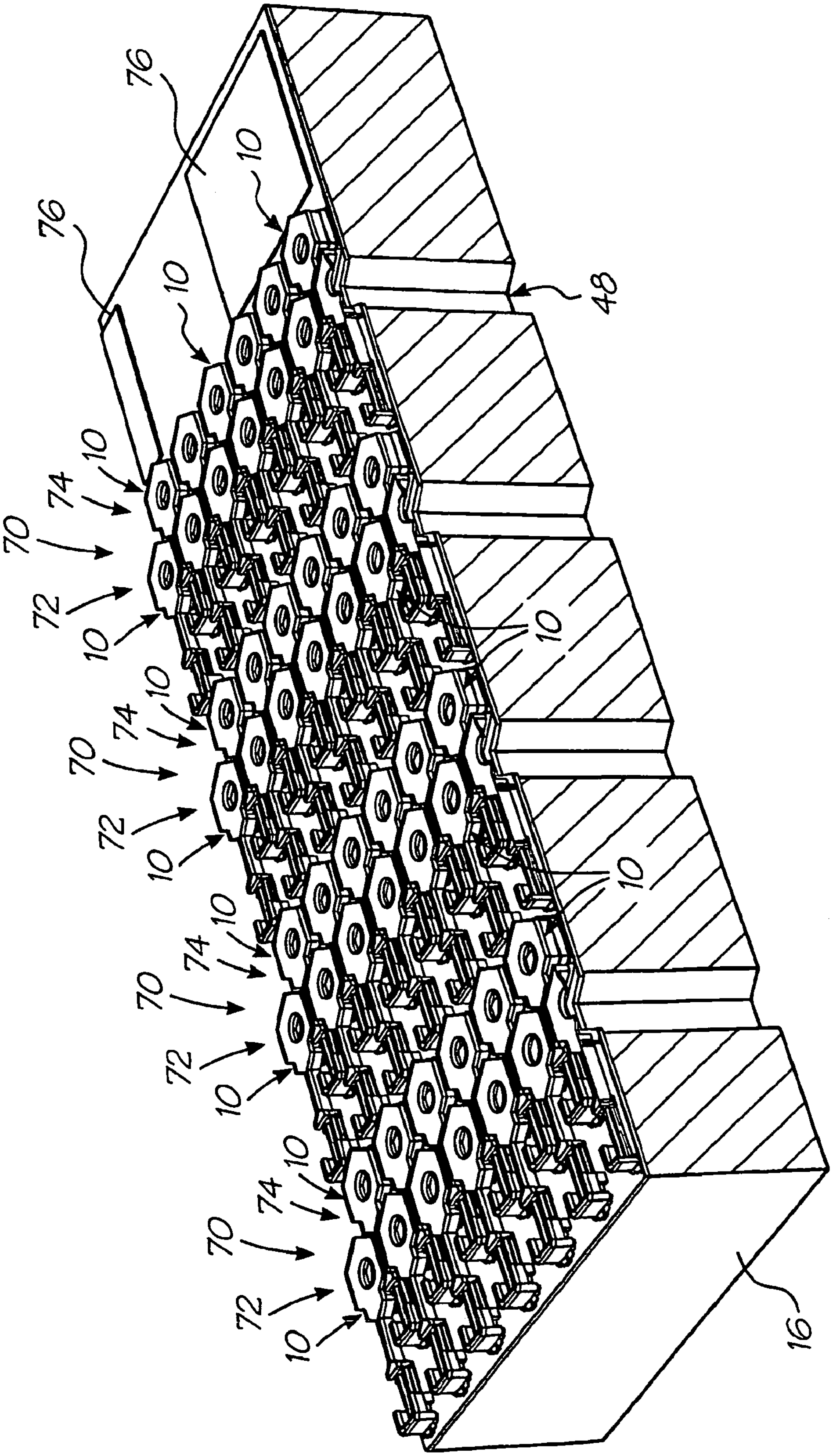
FIG. 5 shows a three dimensional view of a nozzle array constituting an ink jet printhead.
Figure 6:
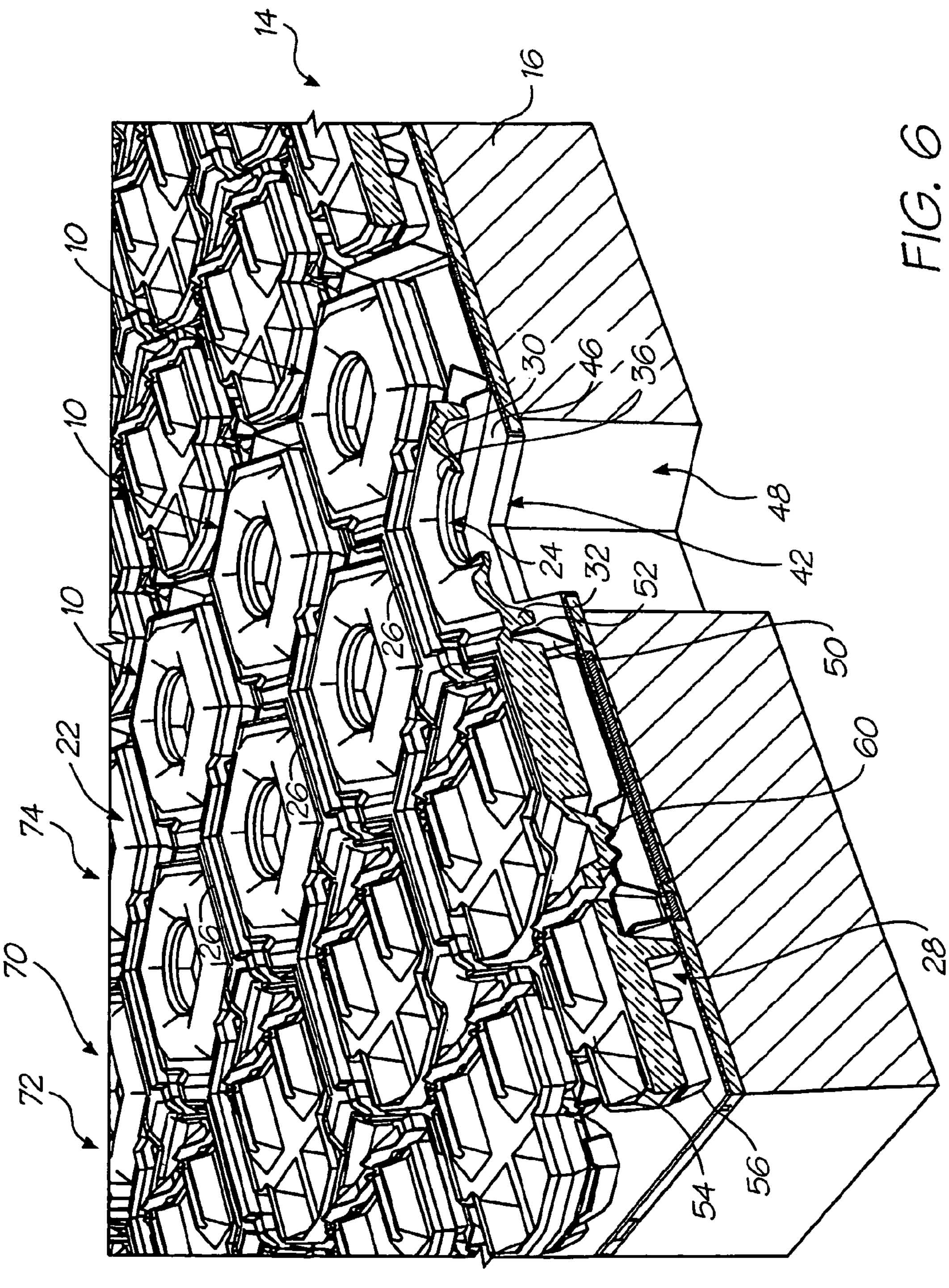
FIG. 6 shows, on an enlarged scale, part of the array of FIG. 5.

Referring now to FIGS. 5 and 6 of the drawings, the nozzle array 14 is described in greater detail. The array 14 is for a four color printhead. Accordingly, the array 14 includes four groups 70 of nozzle assemblies, one for each color. Each group 70 has its nozzle assemblies 10 arranged in two rows 72 and 74. One of the groups 70 is shown in greater detail in FIG. 6 of the drawings.

To facilitate close packing of the nozzle assemblies 10 in the rows 72 and 74, the nozzle assemblies 10 in the row 74 are offset or staggered with respect to the nozzle assemblies 10 in the row 72. Also, the nozzle assemblies 10 in the row 72 are spaced apart sufficiently far from each other to enable the lever arms 26 of the nozzle assemblies 10 in the row 74 to pass between adjacent nozzles 22 of the assemblies 10 in the row 72. It is to be noted that each nozzle assembly 10 is substantially dumbbell shaped so that the nozzles 22 in the row 72 nest between the nozzles 22 and the actuators 28 of adjacent nozzle assemblies 10 in the row 74.

Further, to facilitate close packing of the nozzles 22 in the rows 72 and 74, each nozzle 22 is substantially hexagonally shaped.

It will be appreciated by those skilled in the art that, when the nozzles 22 are displaced towards the substrate 16, in use, due to the nozzle opening 24 being at a slight angle with respect to the nozzle chamber 34 ink is ejected slightly off the perpendicular. It is an advantage of the arrangement shown in FIGS. 5 and 6 of the drawings that the actuators 28 of the nozzle assemblies 10 in the rows 72 and 74 extend in the same direction to one side of the rows 72 and 74. Hence, the ink ejected from the nozzles 22 in the row 72 and the ink ejected from the nozzles 22 in the row 74 are offset with respect to each other by the same angle resulting in an improved print quality.

Also, as shown in FIG. 5 of the drawings, the substrate 16 has bond pads 76 arranged thereon which provide the electrical connections, via the pads 56, to the actuators 28 of the nozzle assemblies 10. These electrical connections are formed via the CMOS layer (not shown).

Figure 7:
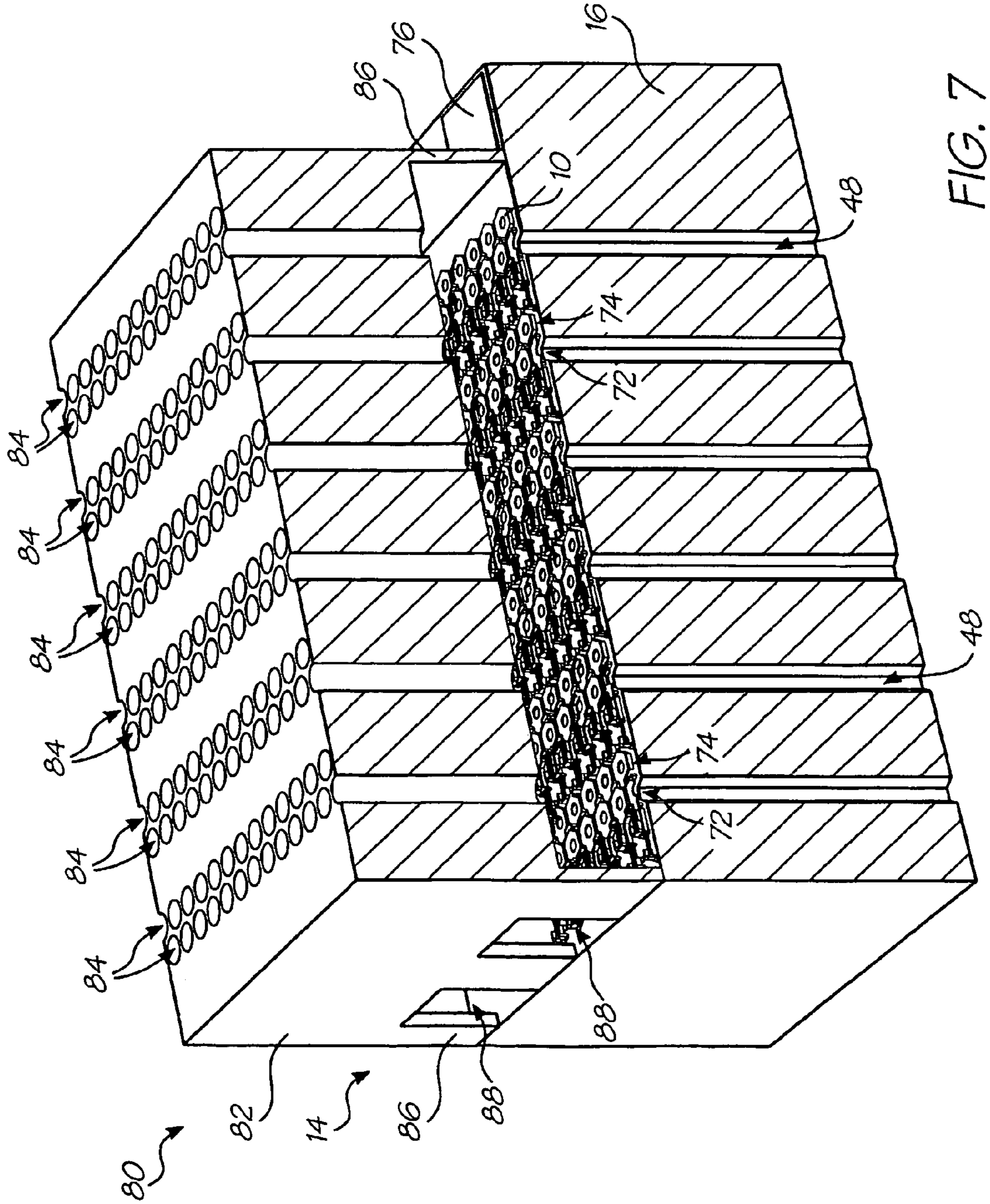
FIG. 7 shows a three dimensional view of an ink jet printhead including a nozzle guard.
Figure 9A:
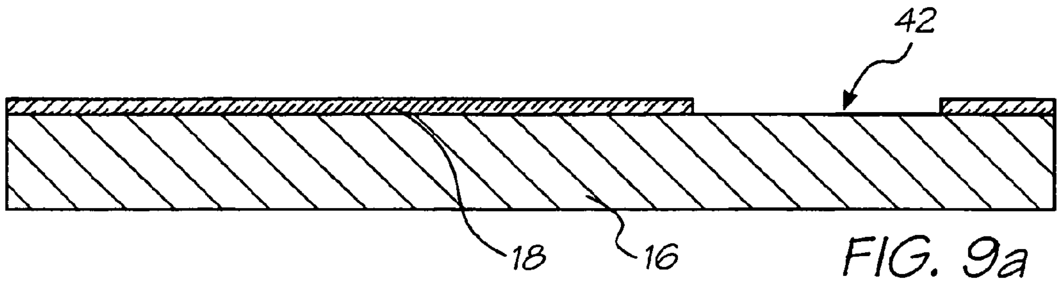
FIGS. 9*a* to 9*r* show sectional side views of the manufacturing steps.
Figure 10A:
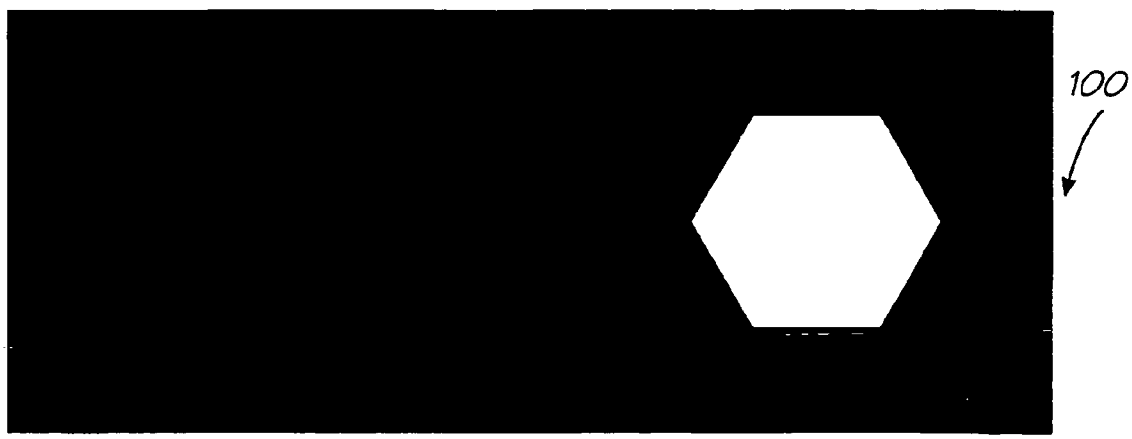
FIGS. 10*a* to 10*k* show layouts of masks used in various steps in the manufacturing process.

Referring to FIG. 7 of the drawings, a development of the invention is shown. With reference to the previous drawings, like reference numerals refer to like parts, unless otherwise specified.

In this development, a nozzle guard 80 is mounted on the substrate 16 of the array 14. The nozzle guard 80 includes a body member 82 having a plurality of passages 84 defined therethrough. The passages 84 are in register with the nozzle openings 24 of the nozzle assemblies 10 of the array 14 such that, when ink is ejected from any one of the nozzle openings 24, the ink passes through the associated passage before striking the print media.

The body member 82 is mounted in spaced relationship relative to the nozzle assemblies 10 by limbs or struts 86. One of the struts 86 has air inlet openings 88 defined therein.

In use, when the array 14 is in operation, air is charged through the inlet openings 88 to be forced through the passages 84 together with ink travelling through the passages 84.

The ink is not entrained in the air as the air is charged through the passages 84 at a different velocity from that of the ink droplets 64. For example, the ink droplets 64 are ejected from the nozzles 22 at a velocity of approximately 3 m/s. The air is charged through the passages 84 at a velocity of approximately 1 m/s.

The purpose of the air is to maintain the passages 84 clear of foreign particles. A danger exists that these foreign particles, such as dust particles, could fall onto the nozzle assemblies 10 adversely affecting their operation. With the provision of the air inlet openings 88 in the nozzle guard 80 this problem is, to a large extent, obviated.

Referring now to FIGS. 8 to 10 of the drawings, a process for manufacturing the nozzle assemblies 10 is described.

Starting with the silicon substrate or wafer 16, the dielectric layer 18 is deposited on a surface of the wafer 16. The dielectric layer 18 is in the form of approximately 1.5 microns of CVD oxide. Resist is spun on to the layer 18 and the layer 18 is exposed to mask 100 and is subsequently developed.

After being developed, the layer 18 is plasma etched down to the silicon layer 16. The resist is then stripped and the layer 18 is cleaned. This step defines the ink inlet aperture 42.

Figure 8A:
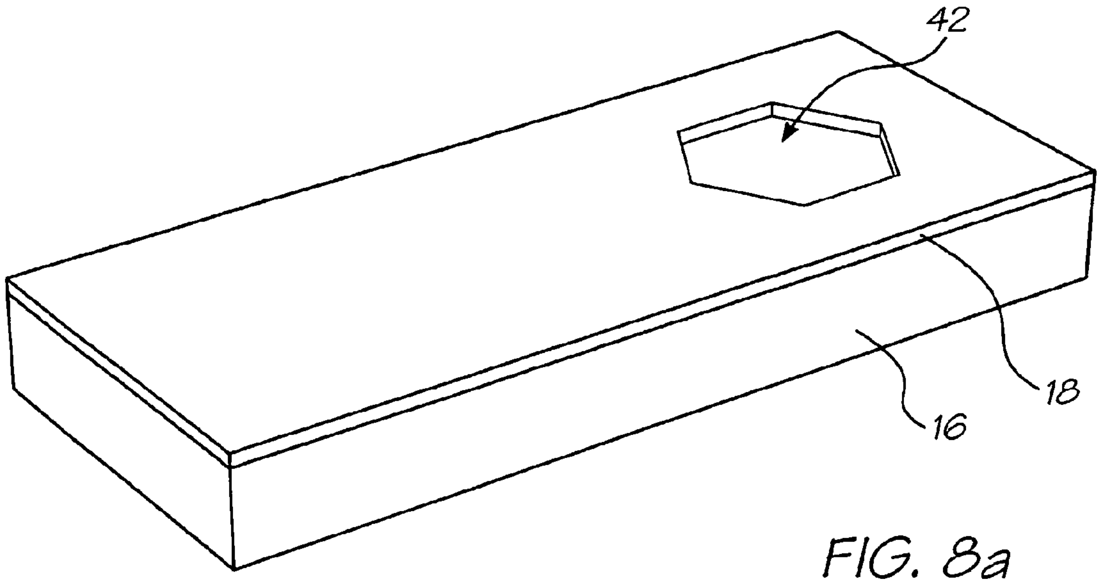
FIGS. 8*a* to 8*r* show three-dimensional views of steps in the manufacture of a nozzle assembly of an ink jet printhead, in accordance with the invention.
Figure 8B:
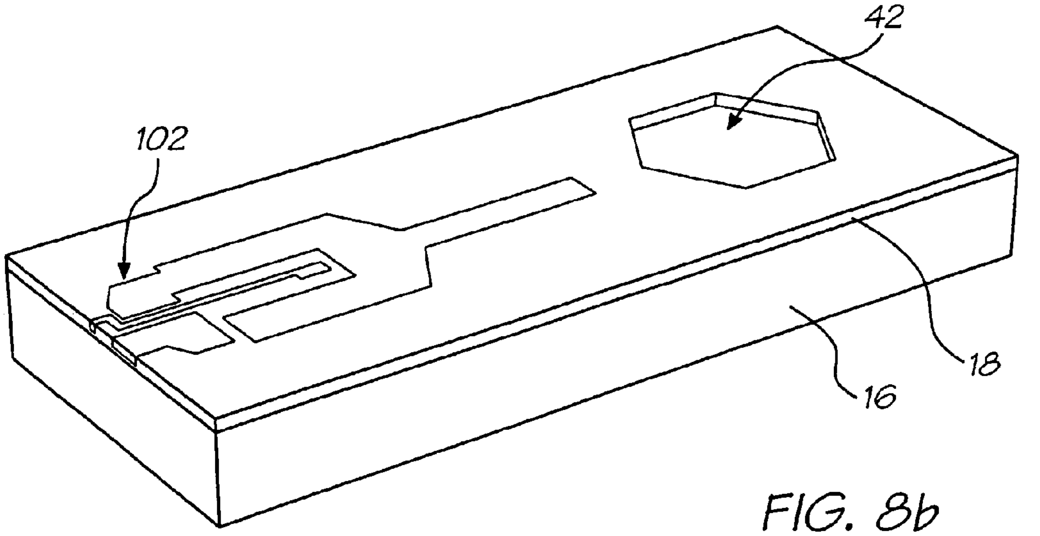
Figure 9B:
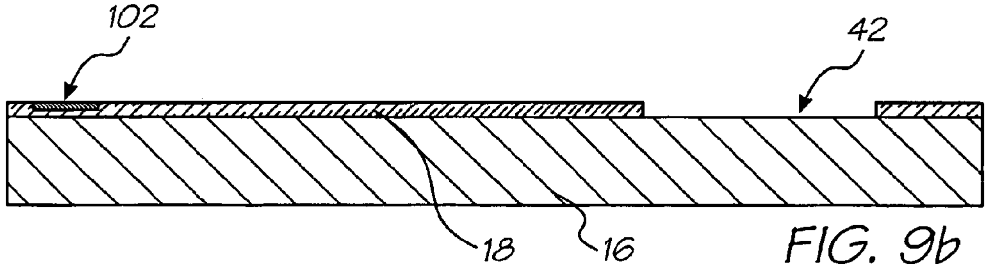
Figure 10B:
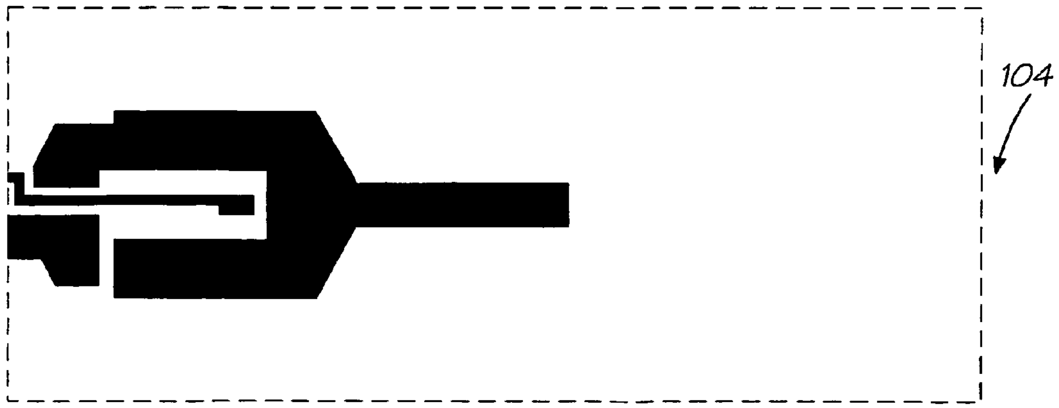
Figure 8C:
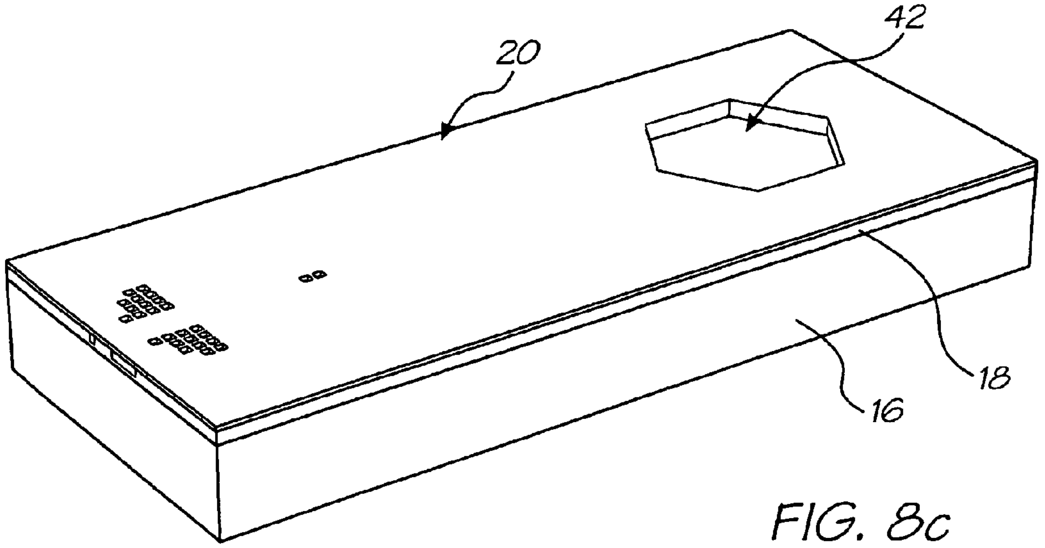
Figure 9C:
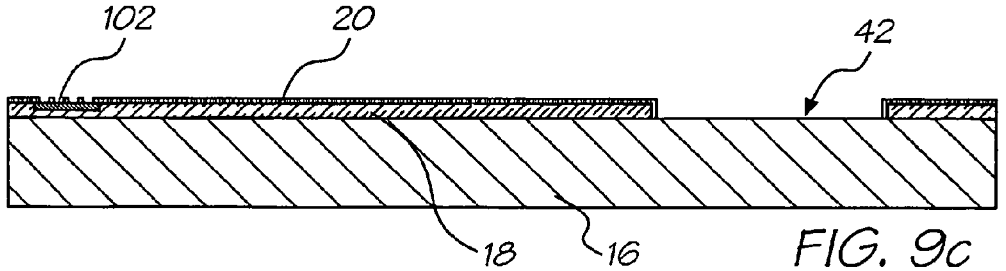
Figure 10C:
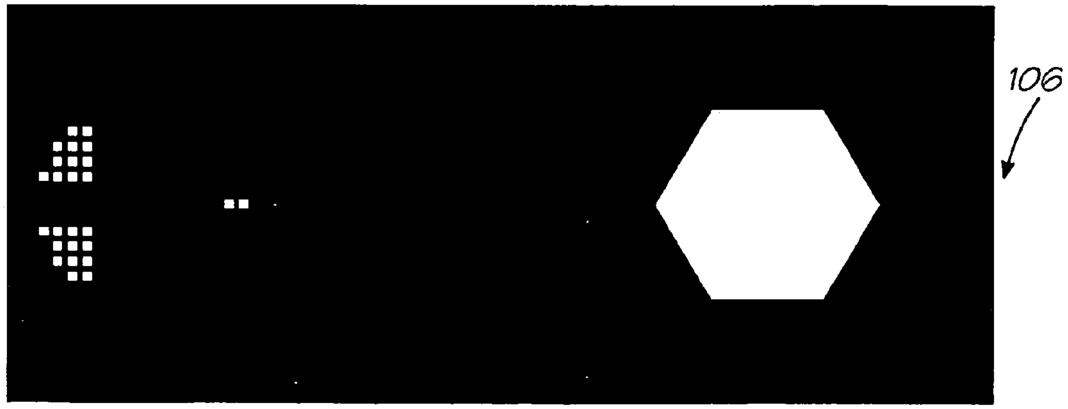
Figure 8D:
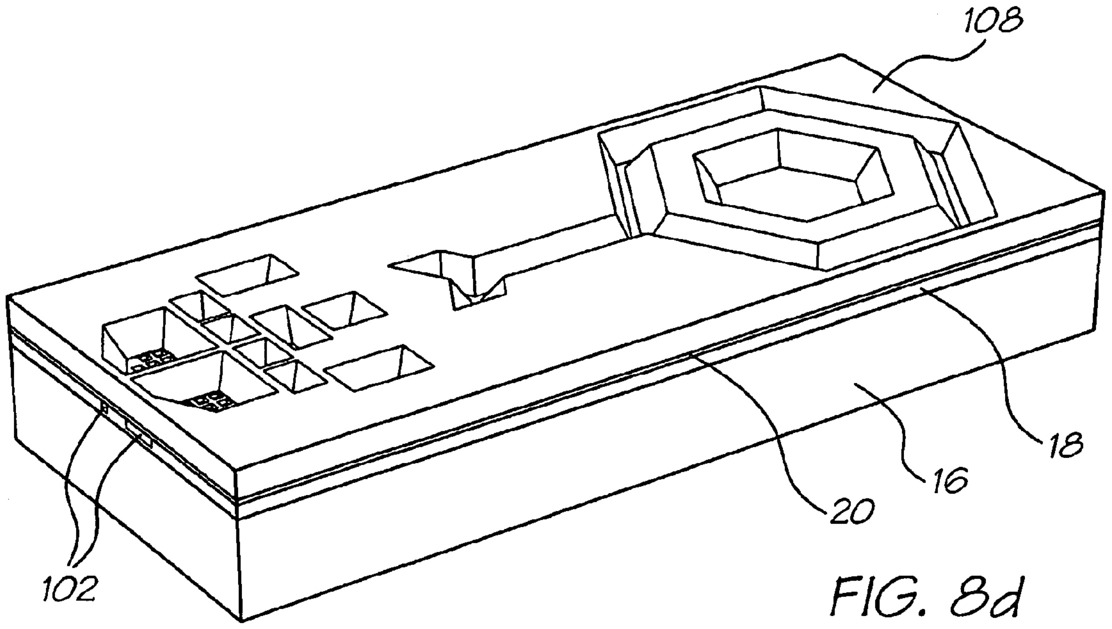
Figure 9D:
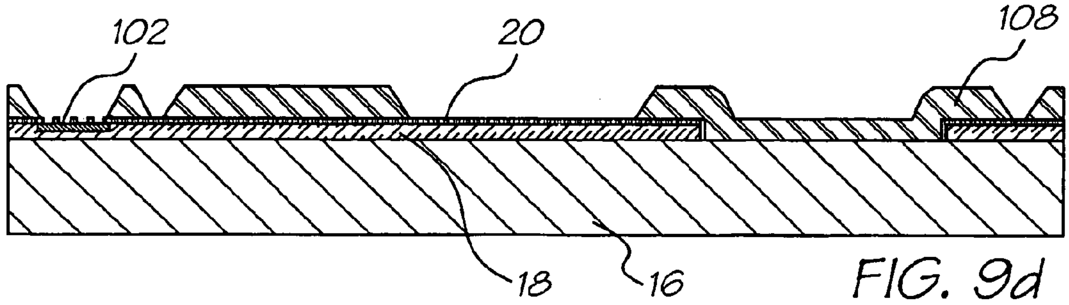
Figure 10D:
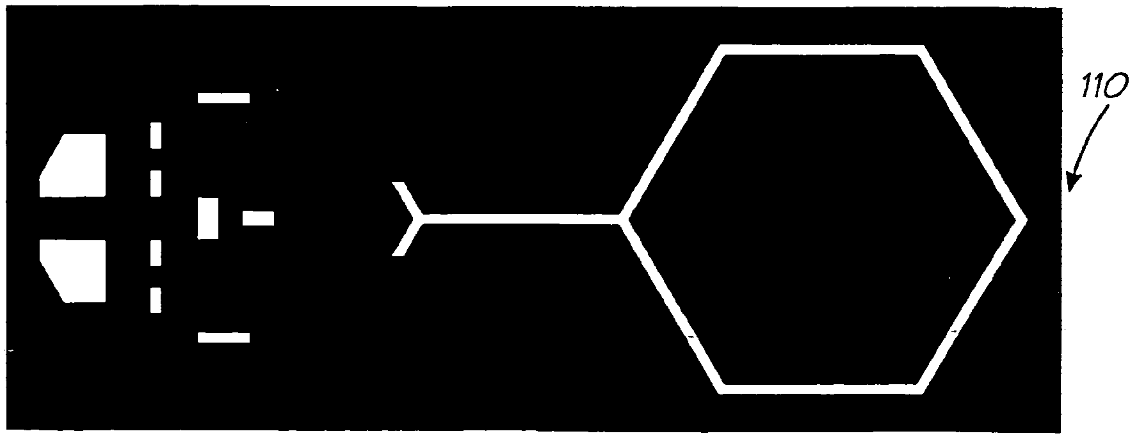

In FIG. 8*b* of the drawings, approximately 0.8 microns of aluminum 102 is deposited on the layer 18. Resist is spun on and the aluminum 102 is exposed to mask 104 and developed. The aluminum 102 is plasma etched down to the oxide layer 18, the resist is stripped and the device is cleaned. This step provides the bond pads and interconnects to the ink jet actuator 28. This interconnect is to an NMOS drive transistor and a power plane with connections made in the CMOS layer (not shown).

Approximately 0.5 microns of PECVD nitride is deposited as the CMOS passivation layer 20. Resist is spun on and the layer 20 is exposed to mask 106 whereafter it is developed. After development, the nitride is plasma etched down to the aluminum layer 102 and the silicon layer 16 in the region of the inlet aperture 42. The resist is stripped and the device cleaned.

A layer 108 of a sacrificial material is spun on to the layer 20. The layer 108 is 6 microns of photo-sensitive polyimide or approximately 4 μm of high temperature resist. The layer 108 is softbaked and is then exposed to mask 110 whereafter it is developed. The layer 108 is then hardbaked at 400° C. for one hour where the layer 108 is comprised of polyimide or at greater than 300° C. where the layer 108 is high temperature resist. It is to be noted in the drawings that the pattern-dependent distortion of the polyimide layer 108 caused by shrinkage is taken into account in the design of the mask 110.

Figure 8E:
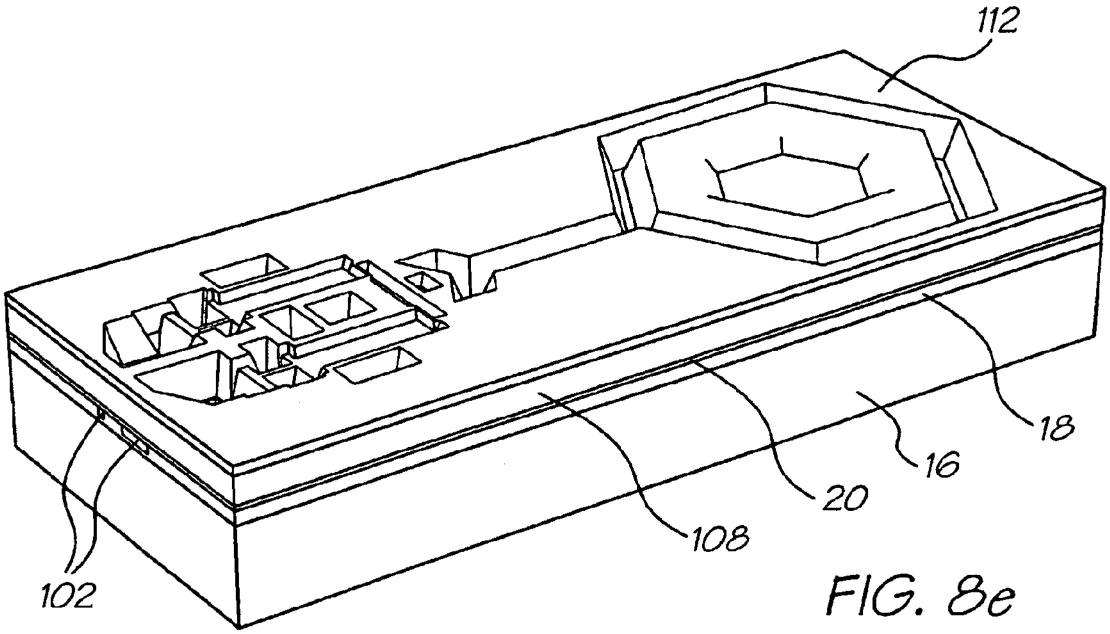
Figure 10E:
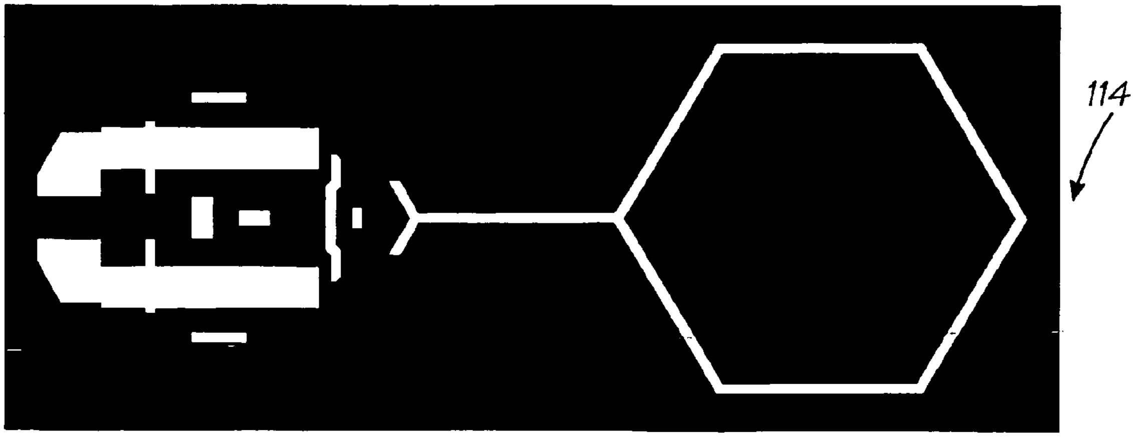
Figure 8F:
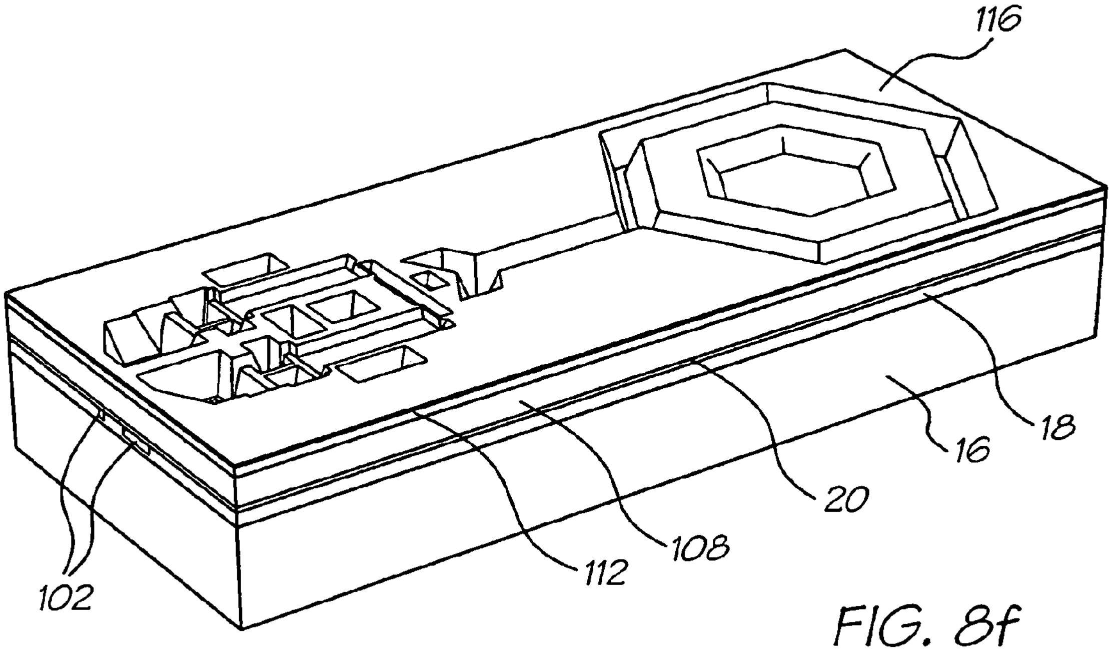
Figure 8G:
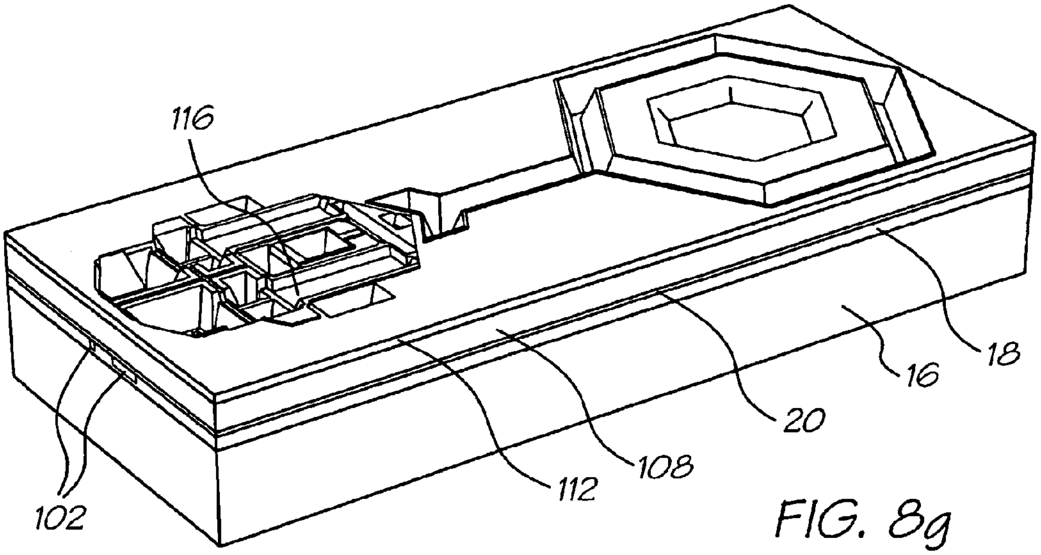
Figure 10F:
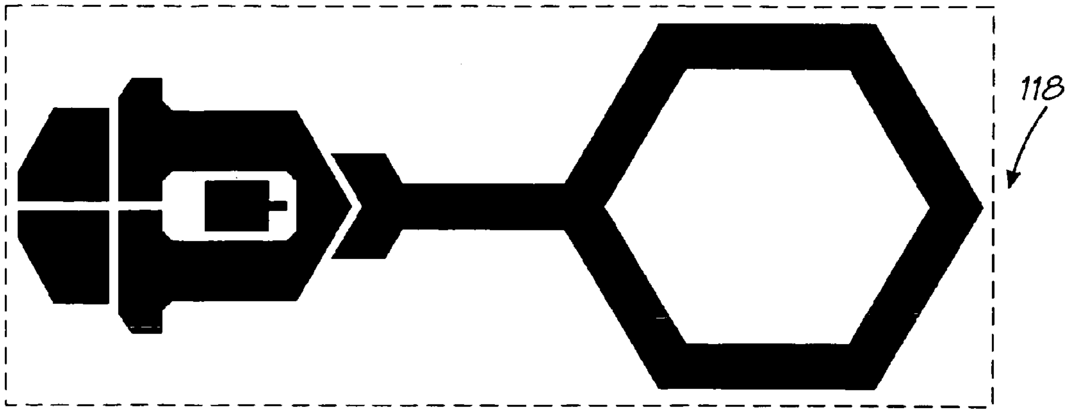
Figure 8H:
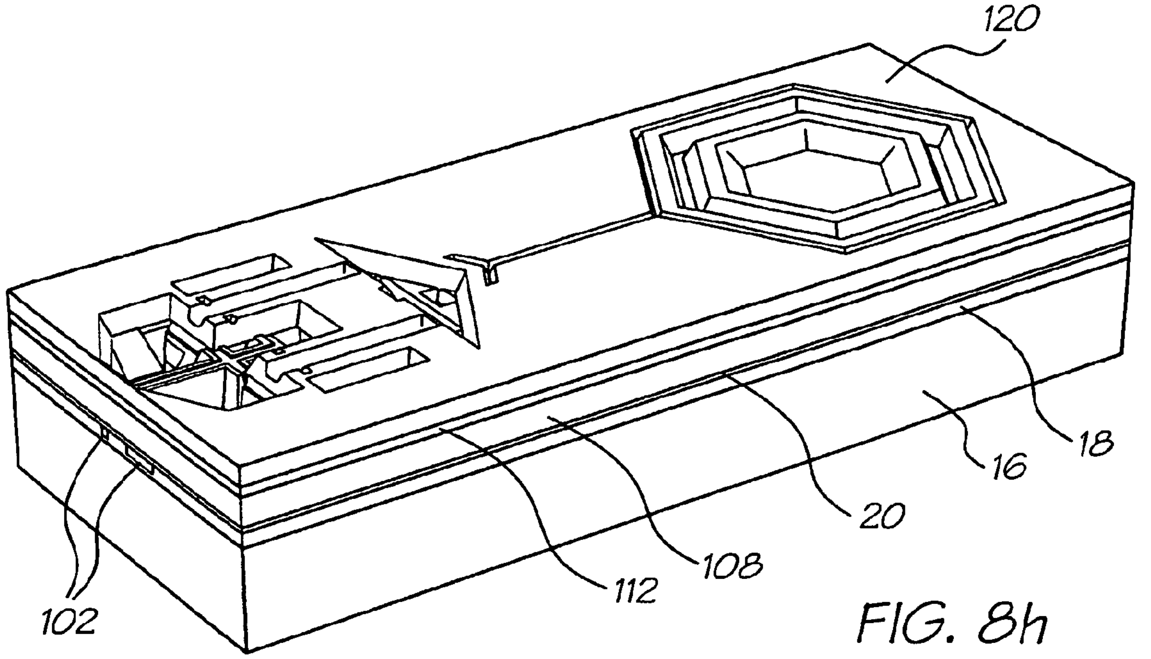
Figure 10G:
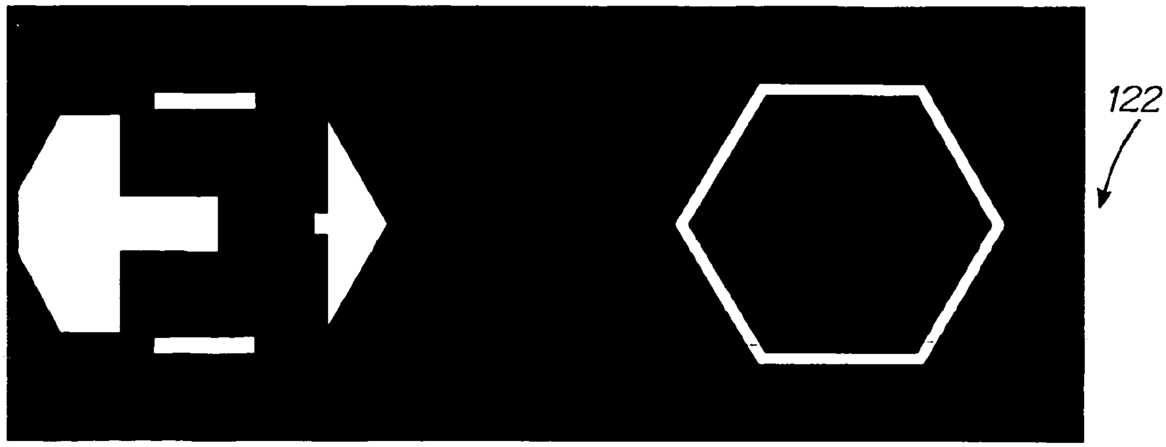
Figure 8I:
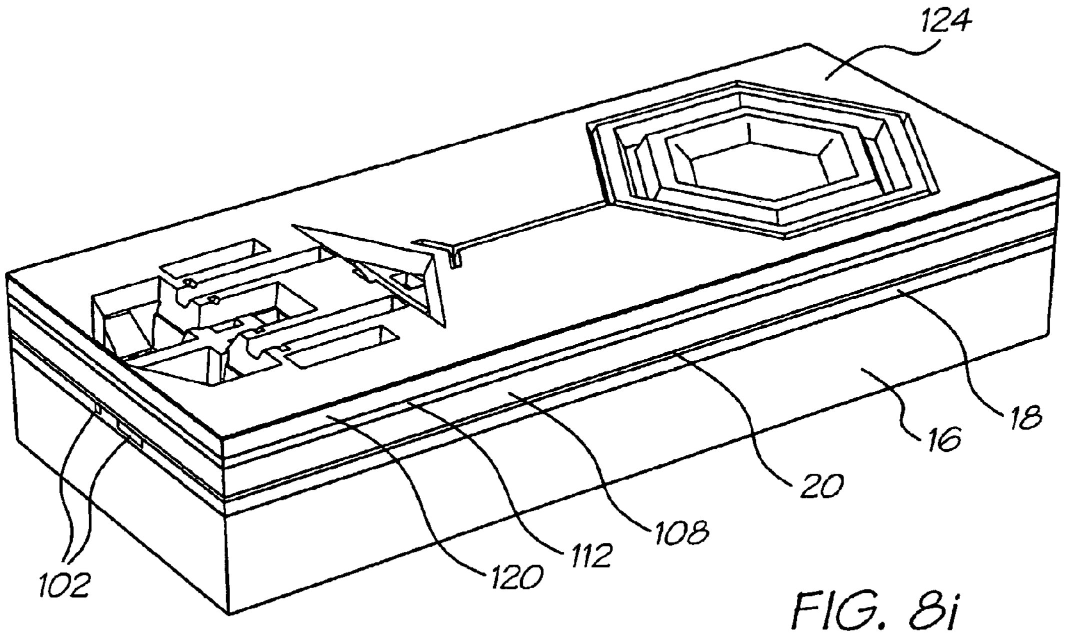
Figure 8J:
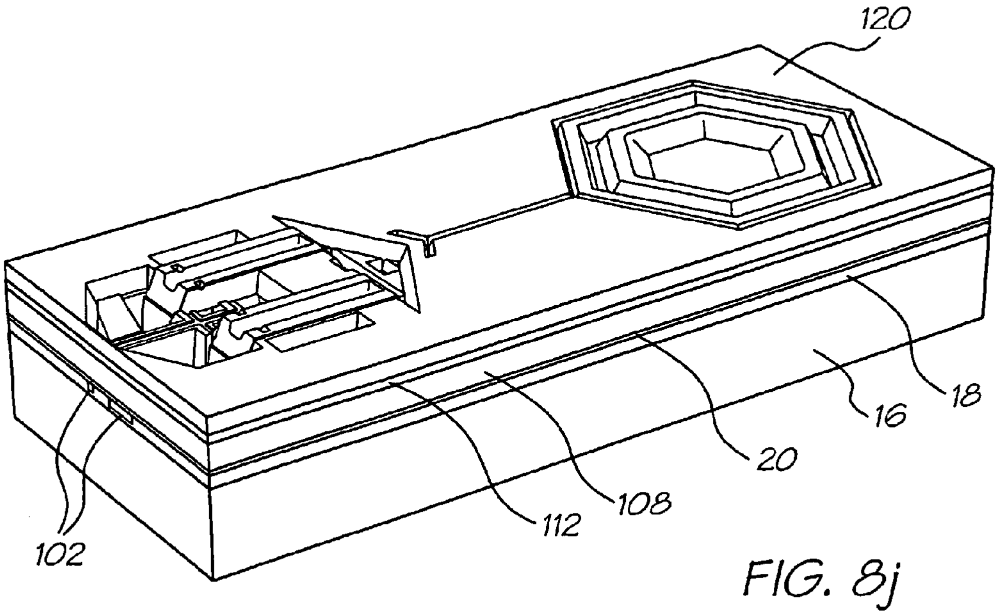
Figure 10H:
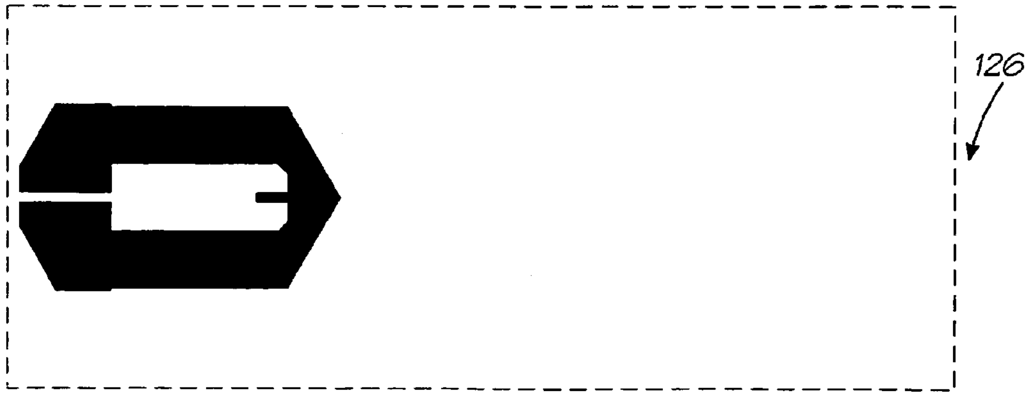
Figure 8K:
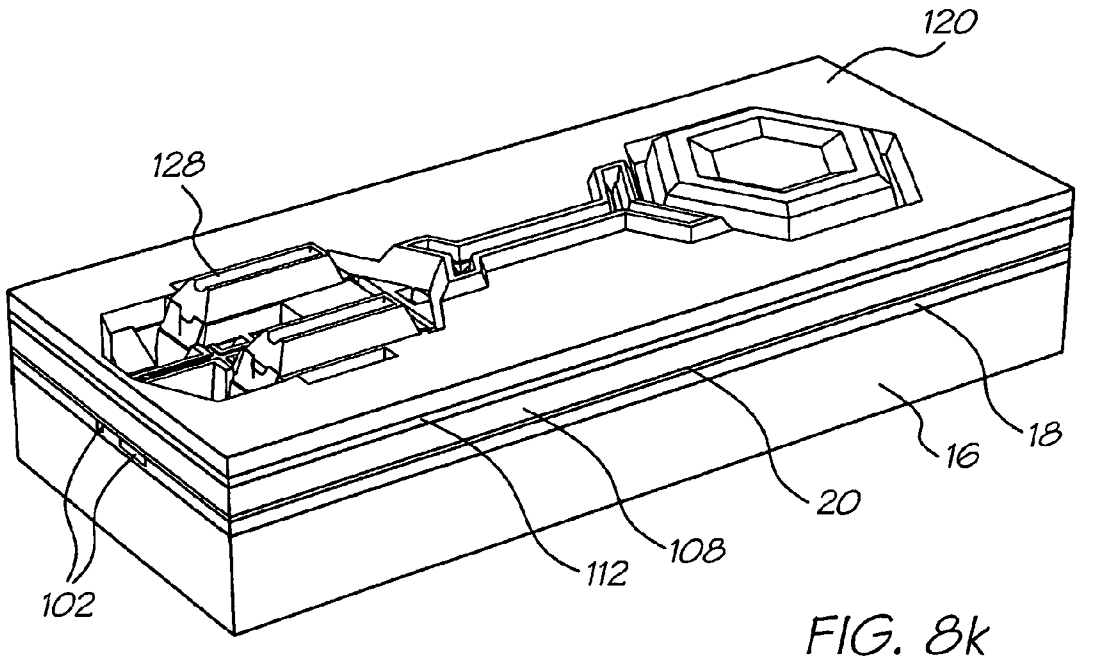

In the next step, shown in FIG. 8*e* of the drawings, a second sacrificial layer 112 is applied. The layer 112 is either 2 μm of photo-sensitive polyimide which is spun on or approximately 1.3 μm of high temperature resist. The layer 112 is softbaked and exposed to mask 114. After exposure to the mask 114, the layer 112 is developed. In the case of the layer 112 being polyimide, the layer 112 is hardbaked at 400° C. for approximately one hour. Where the layer 112 is resist, it is hardbaked at greater than 300° C. for approximately one hour.

A 0.2 micron multi-layer metal layer 116 is then deposited. Part of this layer 116 forms the passive beam 60 of the actuator 28.

The layer 116 is formed by sputtering 1,000 Å of titanium nitride (TiN) at around 300° C. followed by sputtering 50 Å of tantalum nitride (TaN). A further 1,000 Å of TiN is sputtered on followed by 50 Å of TaN and a further 1,000 Å of TiN.

Other materials which can be used instead of TiN are $TiB_2$, $MoSi_2$ or (Ti, Al)N.

The layer 116 is then exposed to mask 118, developed and plasma etched down to the layer 112 whereafter resist, applied for the layer 116, is wet stripped taking care not to remove the cured layers 108 or 112.

A third sacrificial layer 120 is applied by spinning on 4 μm of photo-sensitive polyimide or approximately 2.6 μm high temperature resist. The layer 120 is softbaked whereafter it is exposed to mask 122. The exposed layer is then developed followed by hard baking. In the case of polyimide, the layer 120 is hardbaked at 400° C. for approximately one hour or at greater than 300° C. where the layer 120 comprises resist.

A second multi-layer metal layer 124 is applied to the layer 120. The constituents of the layer 124 are the same as the layer 116 and are applied in the same manner. It will be appreciated that both layers 116 and 124 are electrically conductive layers.

The layer 124 is exposed to mask 126 and is then developed. The layer 124 is plasma etched down to the polyimide or resist layer 120 whereafter resist applied for the layer 124 is wet stripped taking care not to remove the cured layers 108, 112 or 120. It will be noted that the remaining part of the layer 124 defines the active beam 58 of the actuator 28.

Figure 9E:
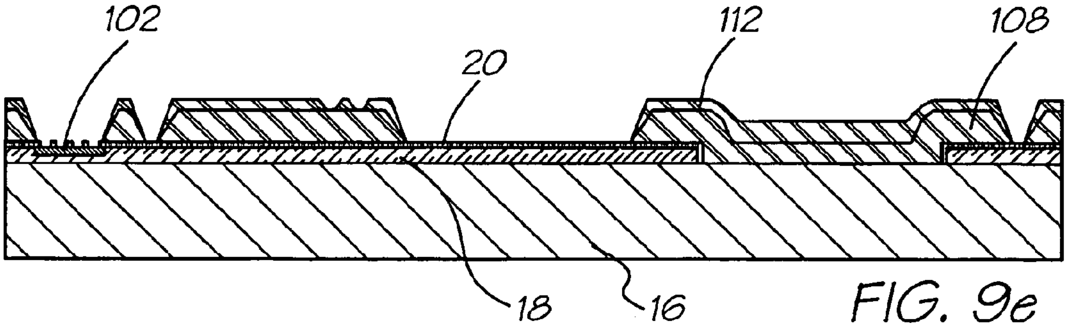
Figure 9F:
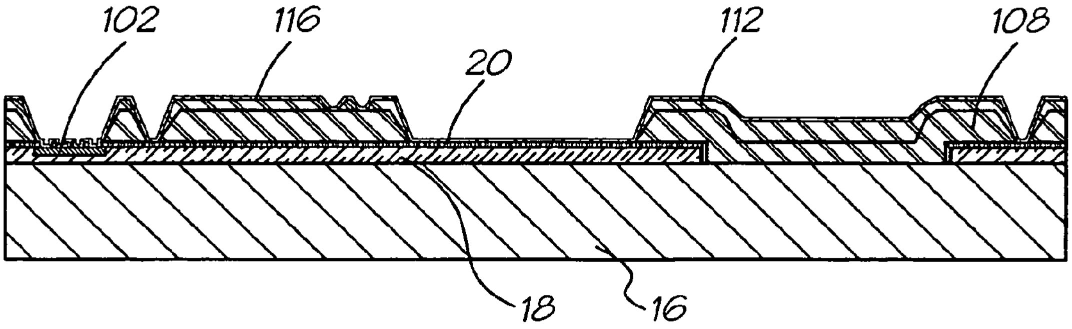
Figure 9G:
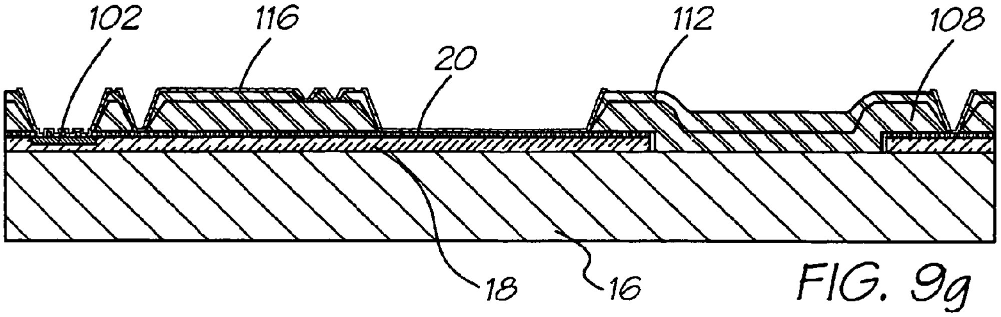
Figure 9H:
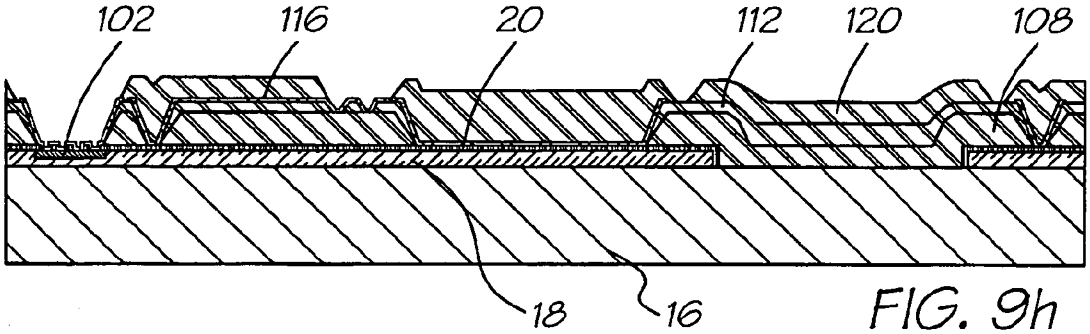
Figure 9I:
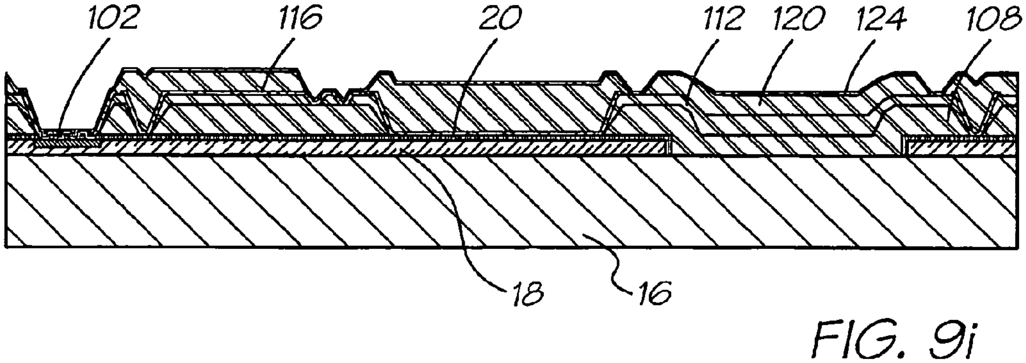
Figure 9J:
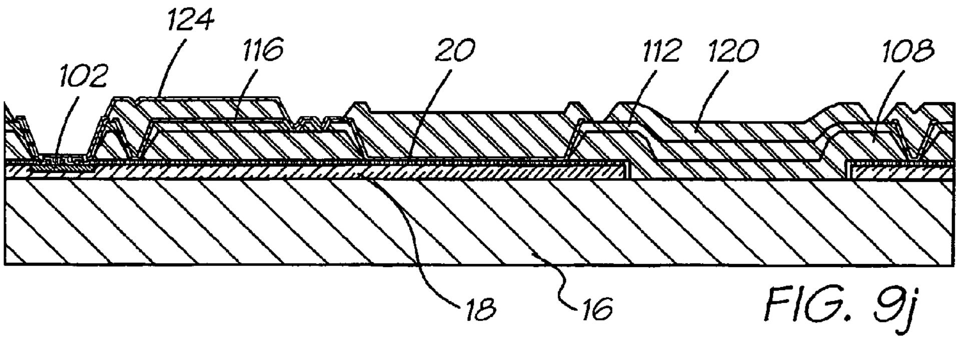
Figure 9K:
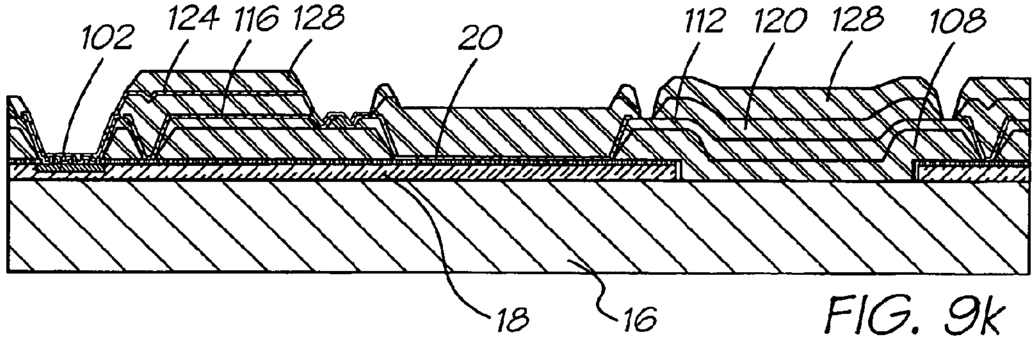
Figure 10I:
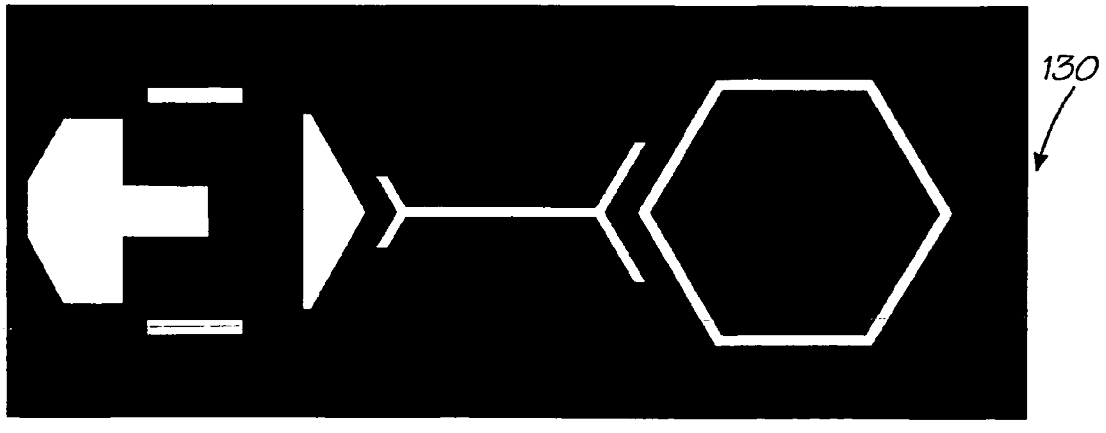

A fourth sacrificial layer 128 is applied by spinning on 4 μm of photo-sensitive polyimide or approximately 2.6 μm of high temperature resist. The layer 128 is softbaked, exposed to the mask 130 and is then developed to leave the island portions as shown in FIG. 9*k* of the drawings. The remaining portions of the layer 128 are hardbaked at 400° C. for approximately one hour in the case of polyimide or at greater than 300° C. for resist.

Figure 81:
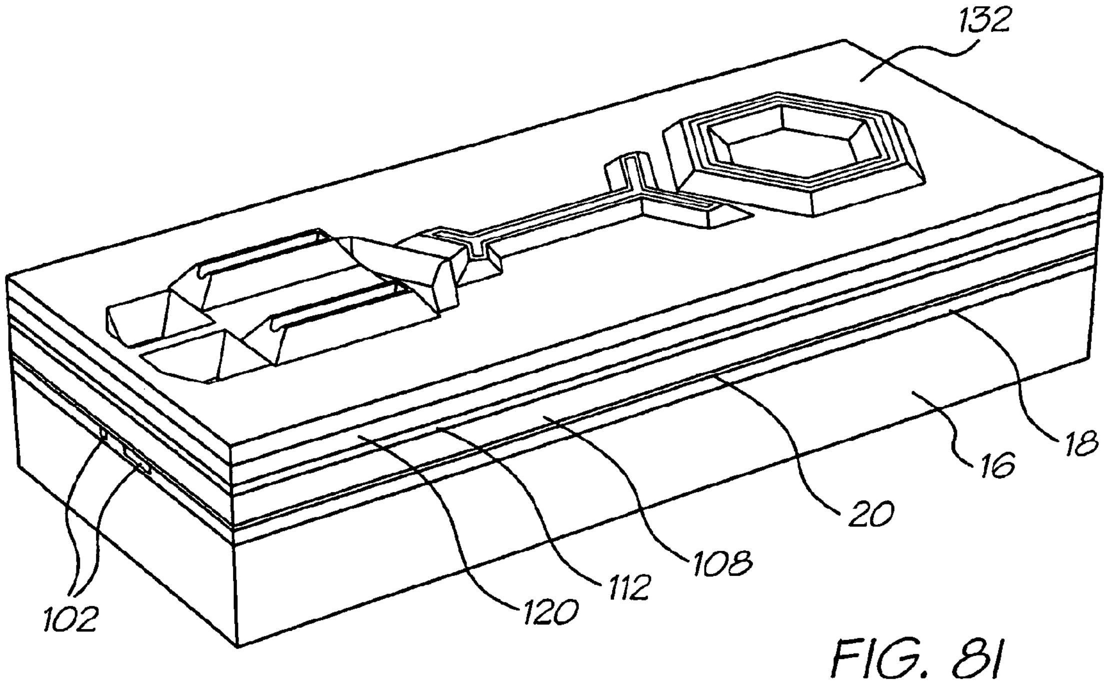
Figure 91:
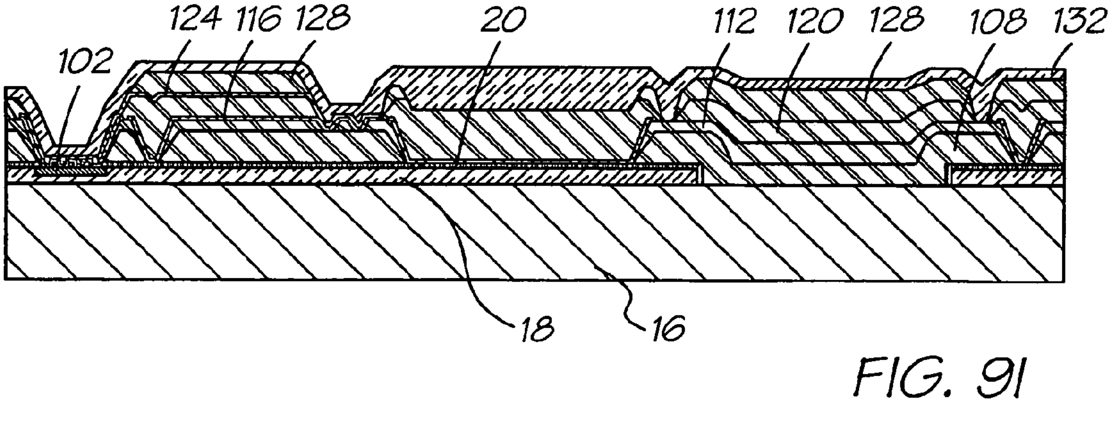
Figure 9M:
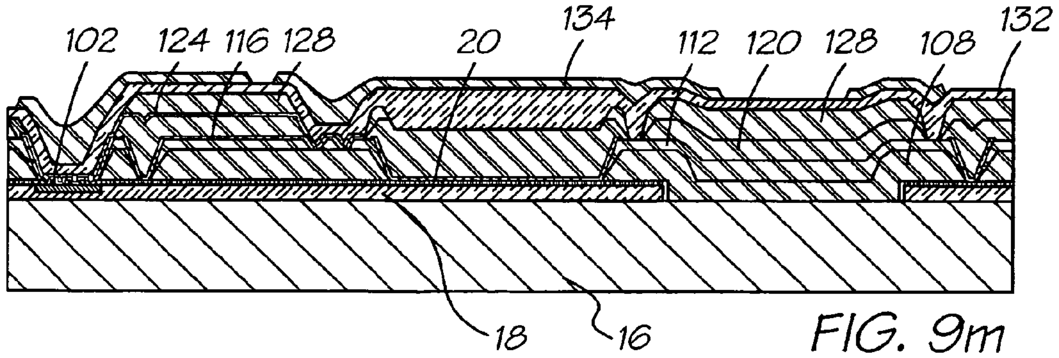
Figure 10J:
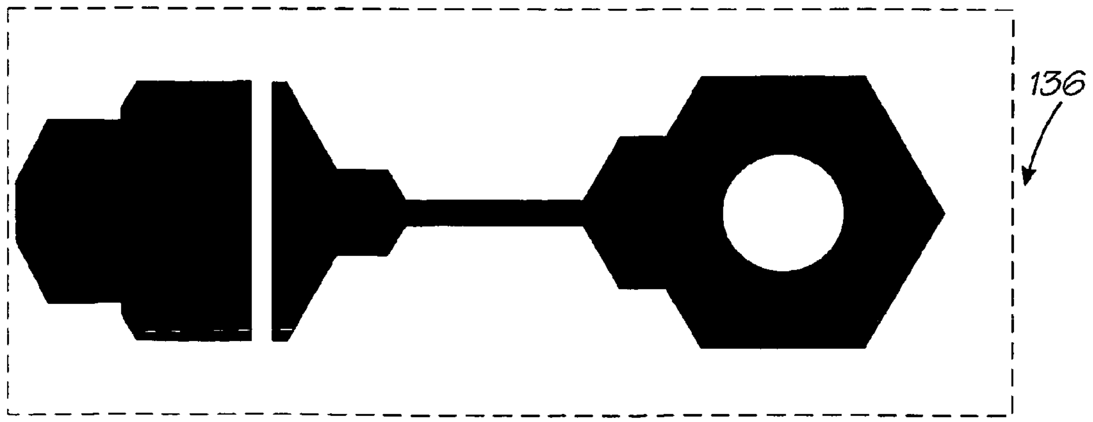
Figure 9N:
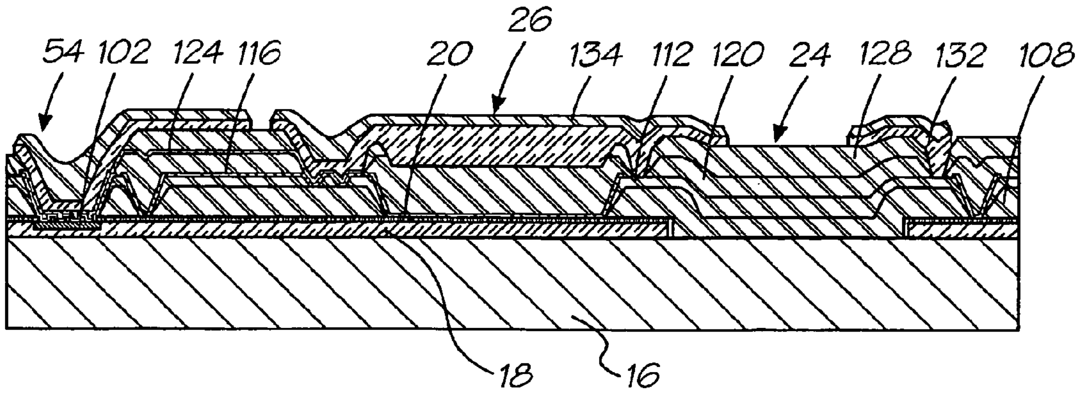
Figure 9O:
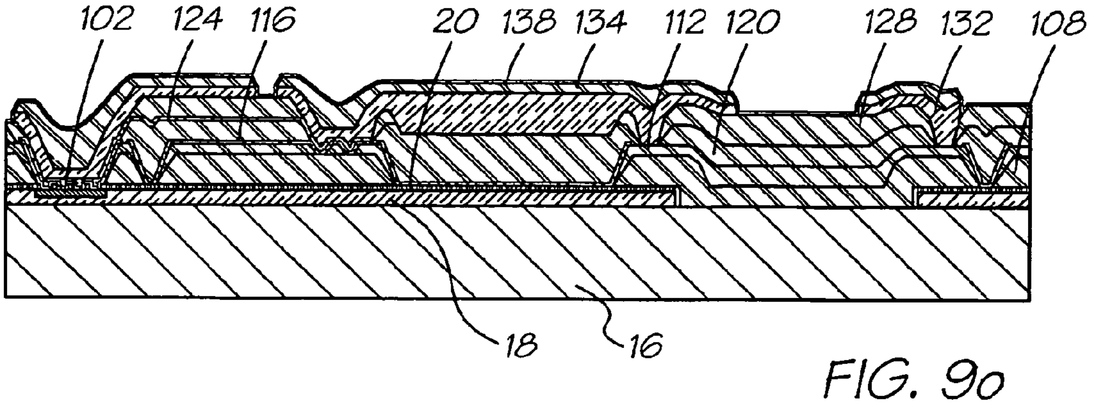

As shown in FIG. 81 of the drawing a high Young's modulus dielectric layer 132 is deposited. The layer 132 is constituted by approximately 1 μm of silicon nitride or aluminum oxide. The layer 132 is deposited at a temperature below the hardbaked temperature of the sacrificial layers 108, 112, 120, 128. The primary characteristics required for this dielectric layer 132 are a high elastic modulus, chemical inertness and good adhesion to TiN.

A fifth sacrificial layer 134 is applied by spinning on 2 μm of photo-sensitive polyimide or approximately 1.3 μm of high temperature resist. The layer 134 is softbaked, exposed to mask 136 and developed. The remaining portion of the layer 134 is then hardbaked at 400° C. for one hour in the case of the polyimide or at greater than 300° C. for the resist.

The dielectric layer 132 is plasma etched down to the sacrificial layer 128 taking care not to remove any of the sacrificial layer 134.

This step defines the nozzle opening 24, the lever arm 26 and the anchor 54 of the nozzle assembly 10.

A high Young's modulus dielectric layer 138 is deposited. This layer 138 is formed by depositing 0.2 μm of silicon nitride or aluminum nitride at a temperature below the hardbaked temperature of the sacrificial layers 108, 112, 120 and 128.

Figure 8M:
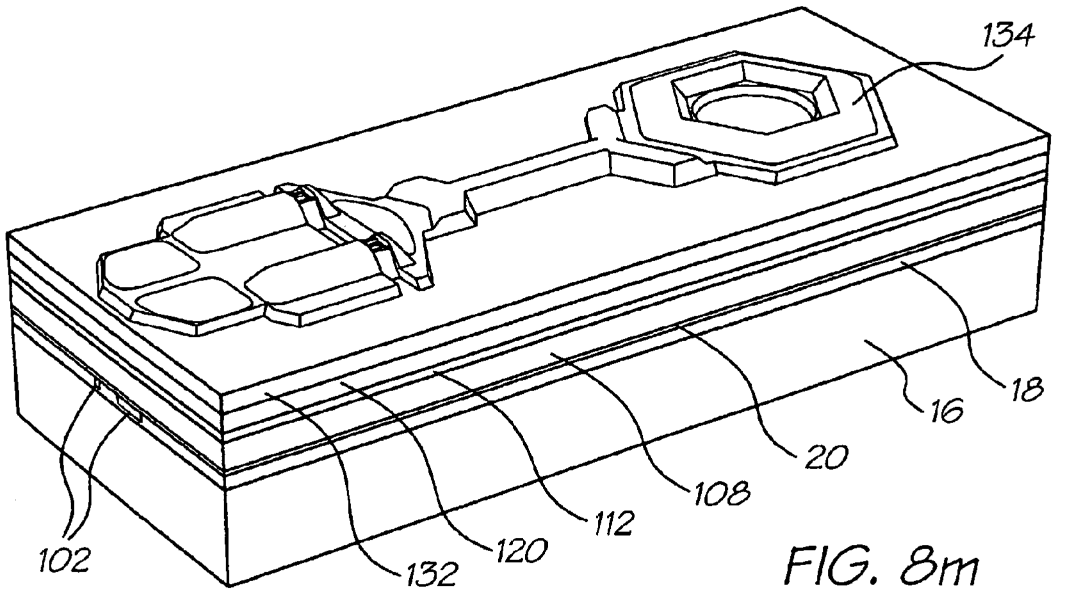
Figure 8N:
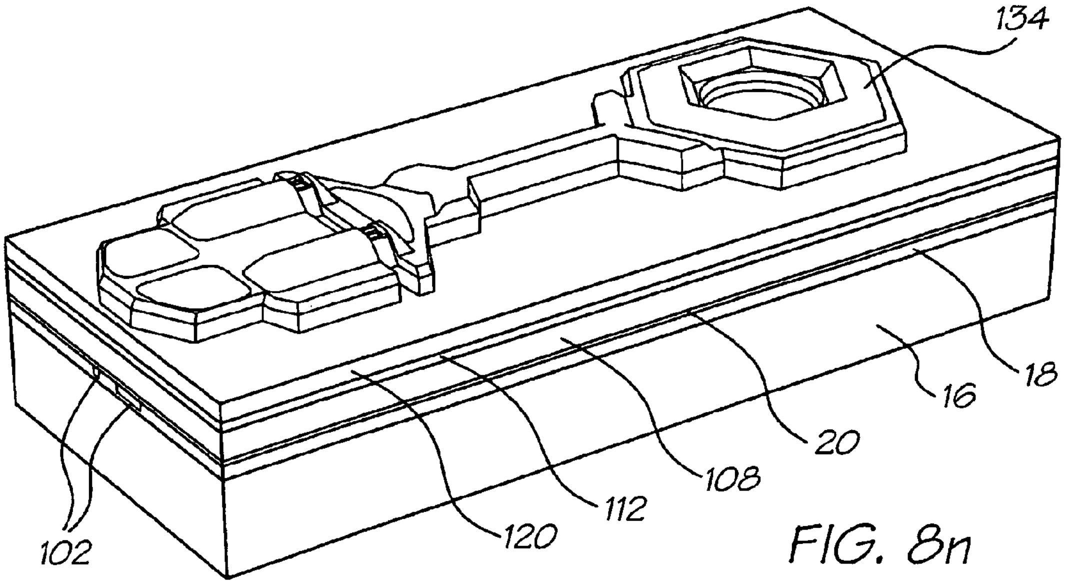
Figure 8O:
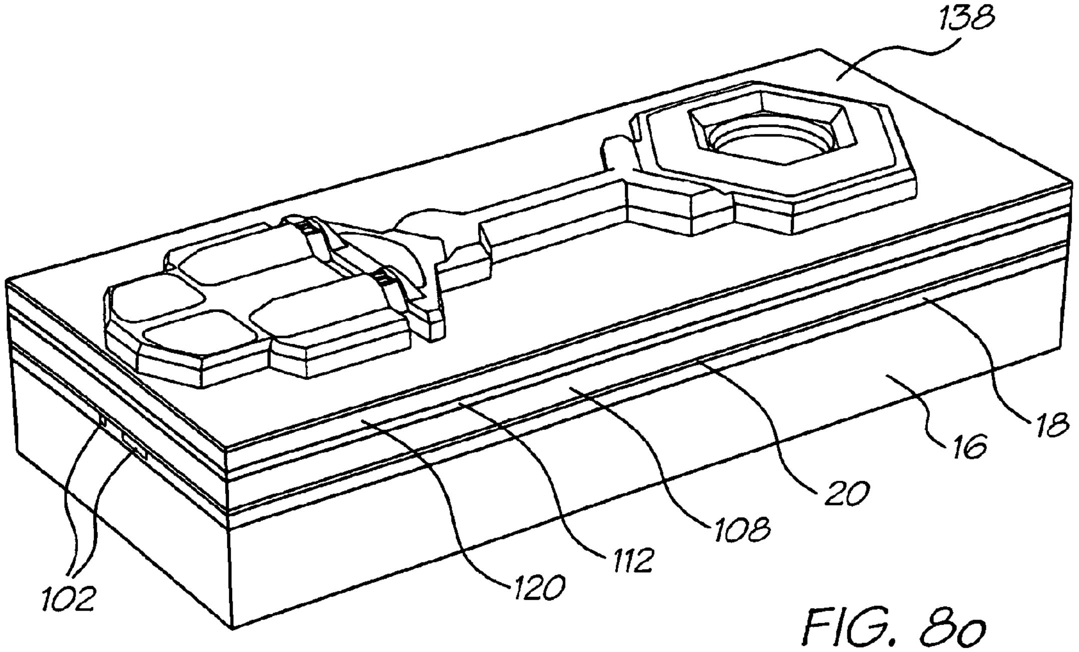
Figure 8P:
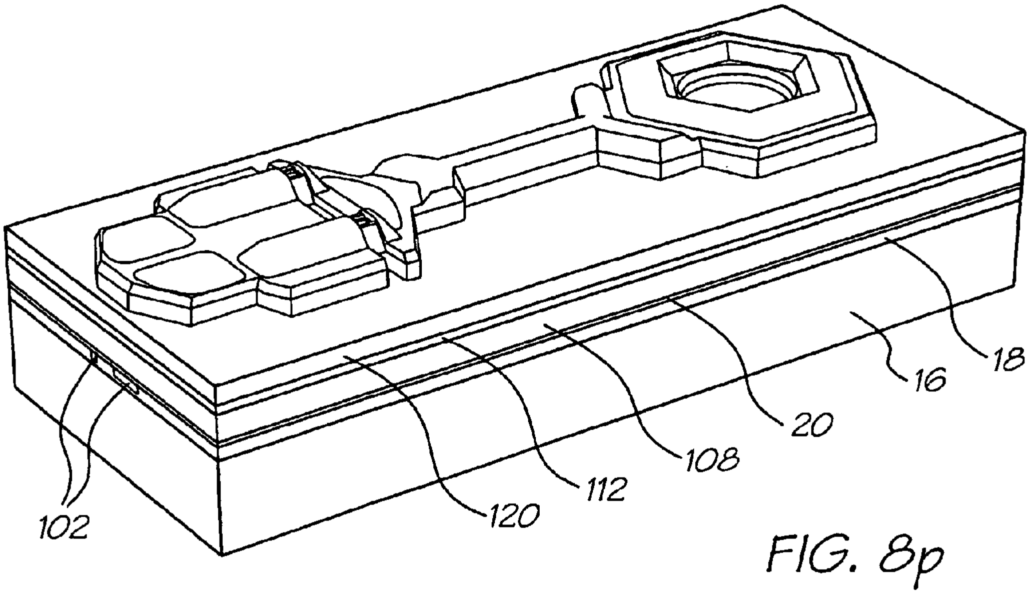
Figure 9P:
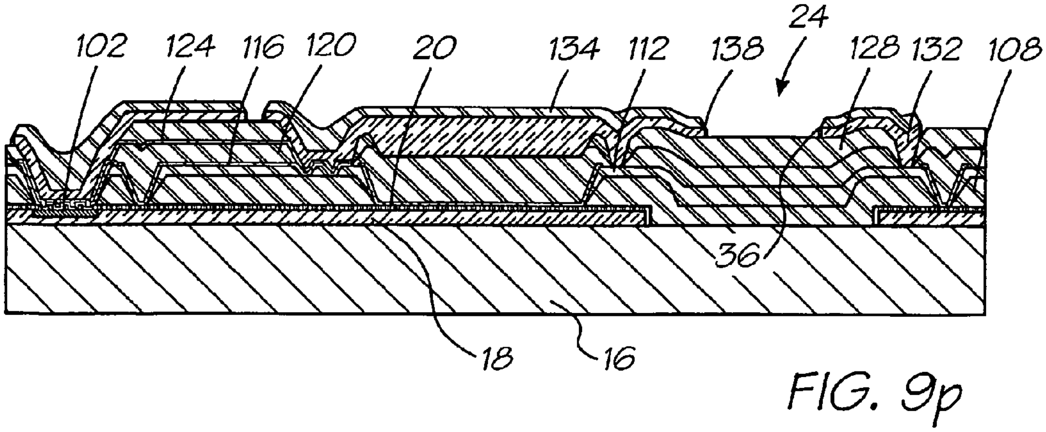
Figure 8Q:
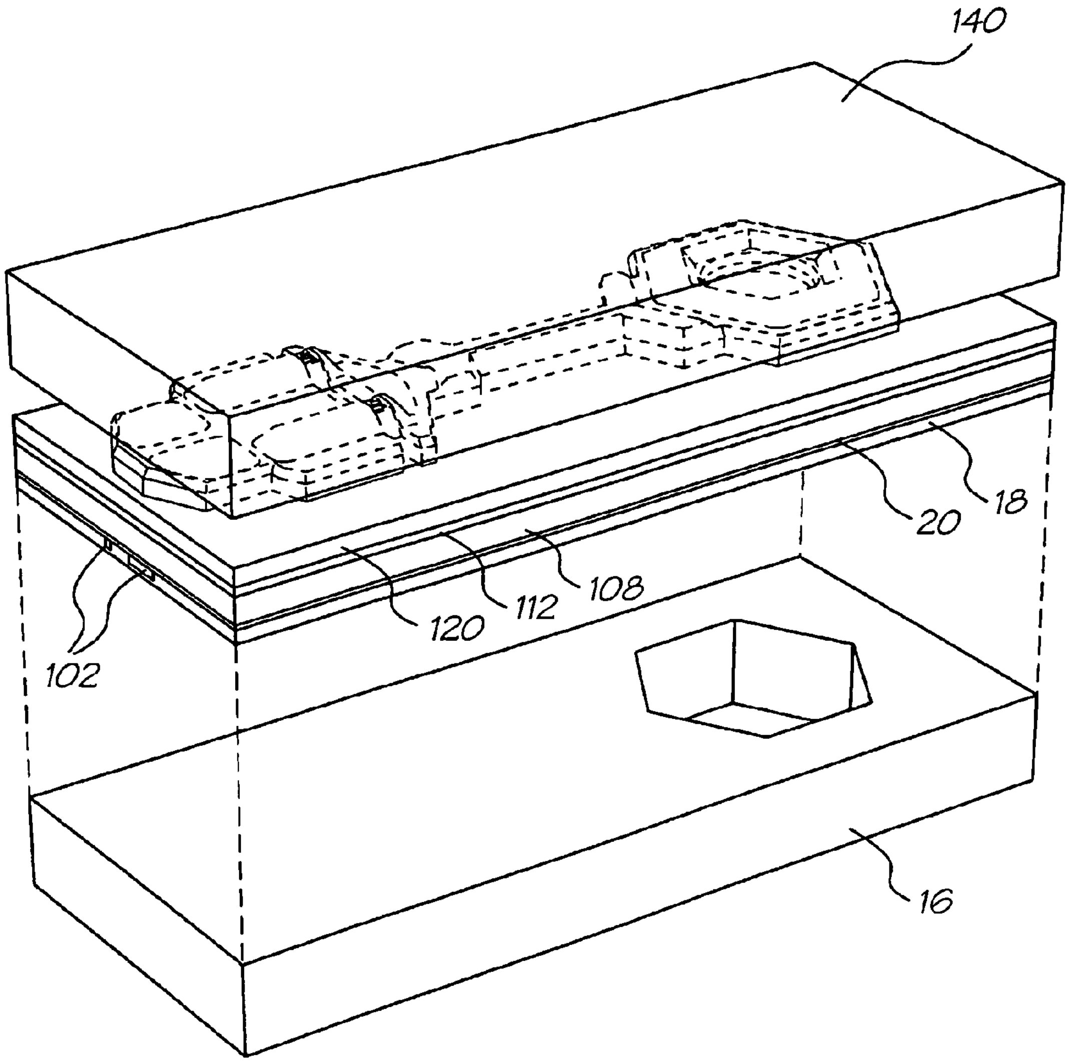
Figure 9Q:
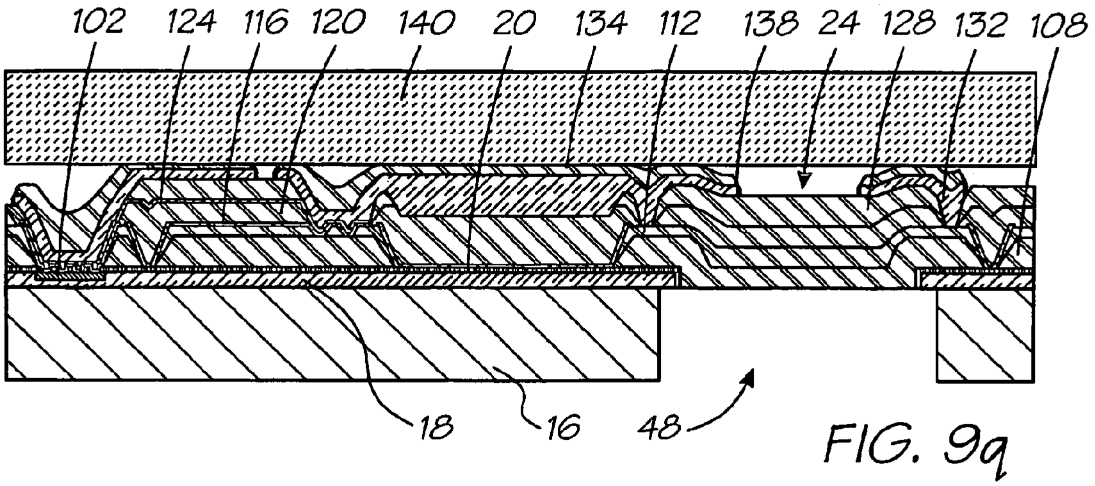
Figure 10K:
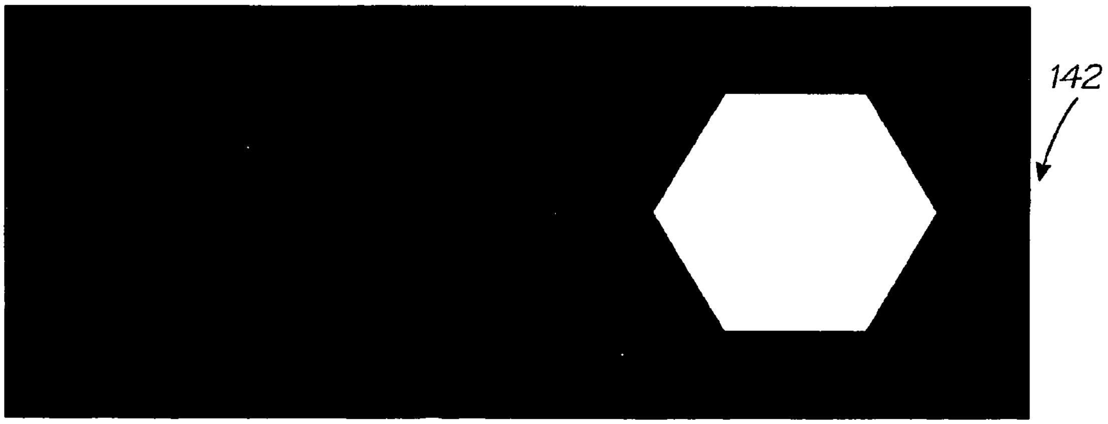

Then, as shown in FIG. 8*p* of the drawings, the layer 138 is anisotropically plasma etched to a depth of 0.35 microns. This etch is intended to clear the dielectric from all of the surface except the side walls of the dielectric layer 132 and the sacrificial layer 134. This step creates the nozzle rim 36 around the nozzle opening 24 which "pins" the meniscus of ink, as described above.

An ultraviolet (UV) release tape 140 is applied. 4 μm of resist is spun on to a rear of the silicon wafer 16. The wafer 16 is exposed to mask 142 to back etch the wafer 16 to define the ink inlet channel 48. The resist is then stripped from the wafer 16.

Figure 8R:
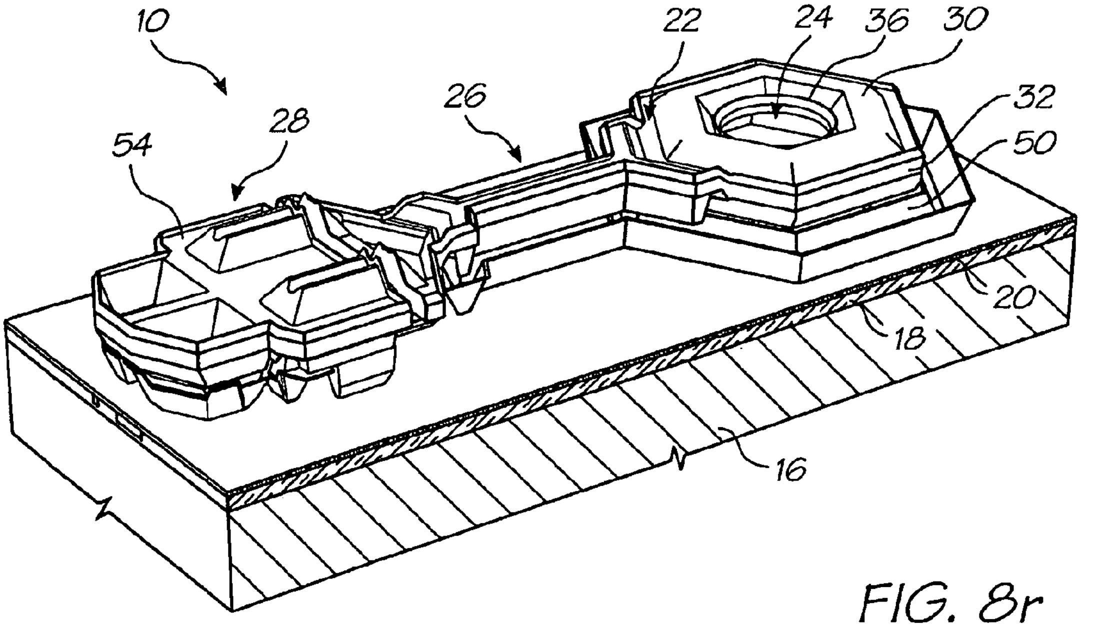
Figure 9R:
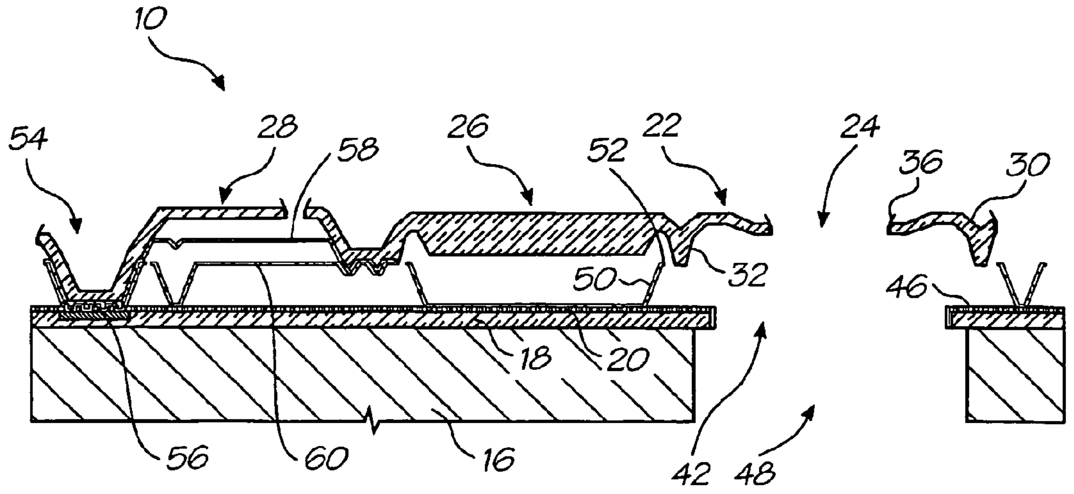
Figure 11A:
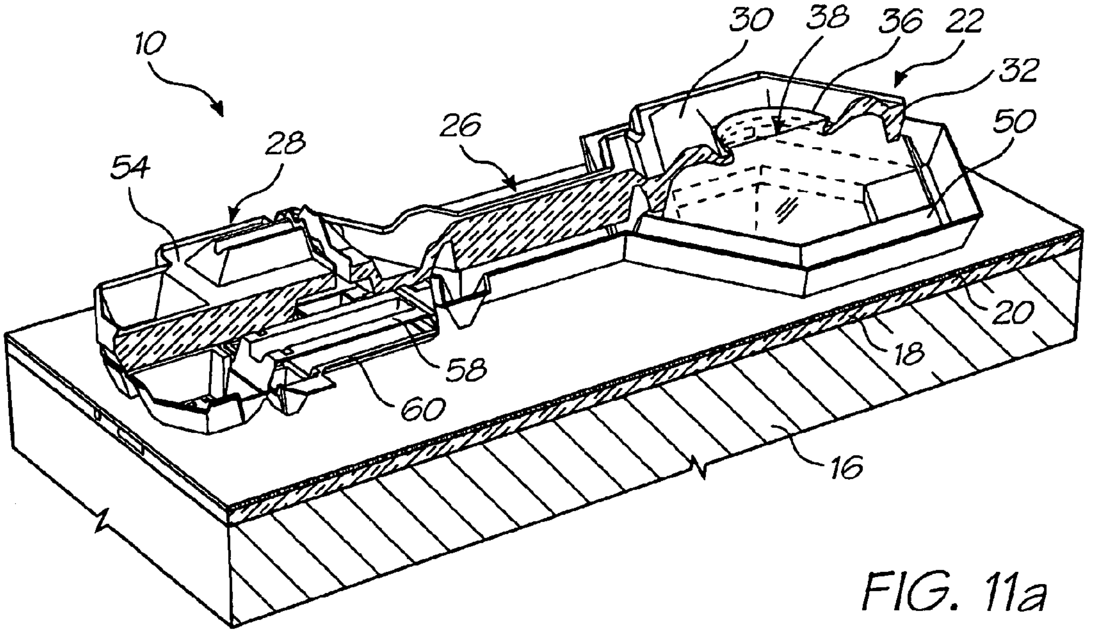
FIGS. 11*a* to 11*c* show three dimensional views of an operation of the nozzle assembly manufactured according to the method of FIGS. 8 and 9.
Figure 12A:
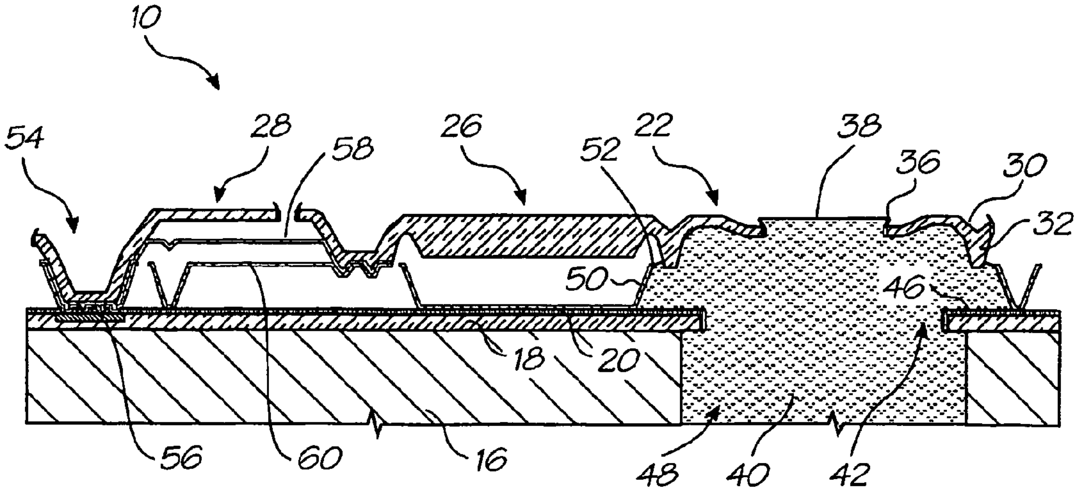
FIGS. 12*a* to 12*c* show sectional side views of an operation of the nozzle assembly manufactured according to the method of FIGS. 8 and 9.
Figure 11B:
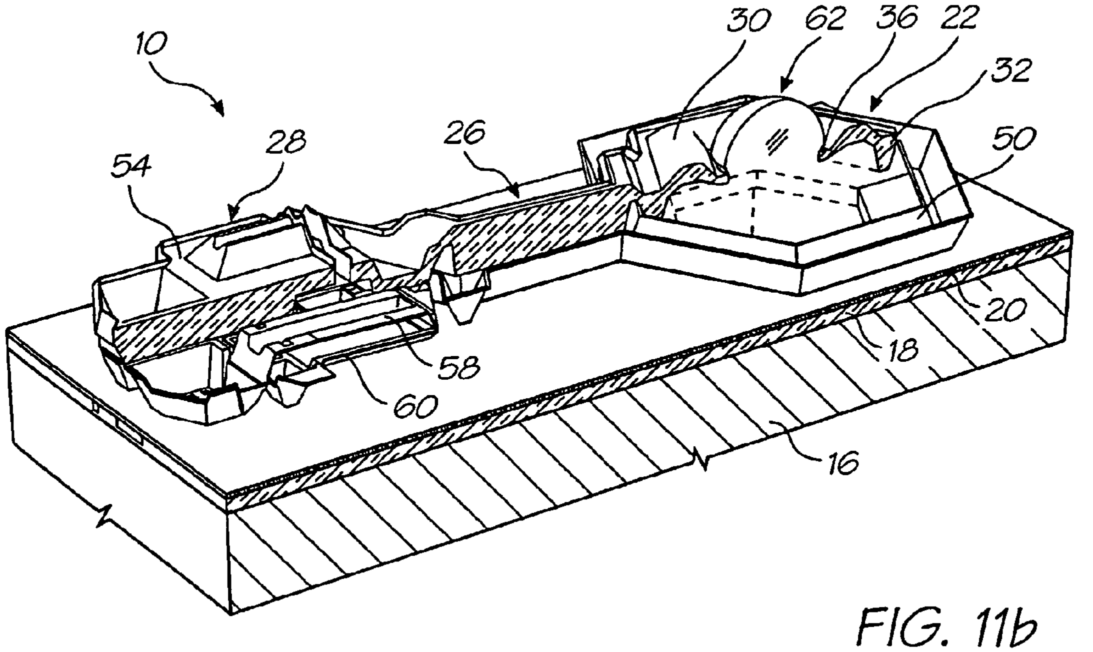
Figure 12B:
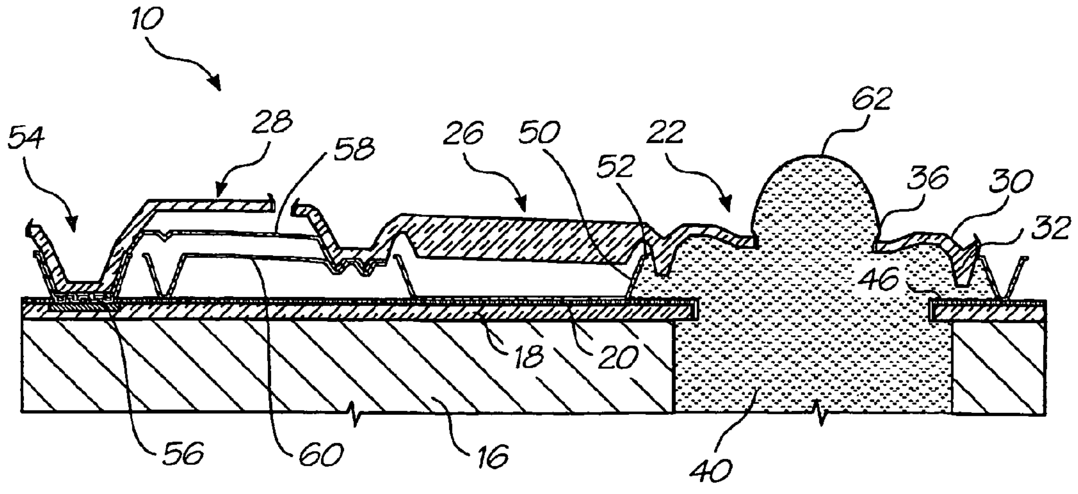
Figure 11C:
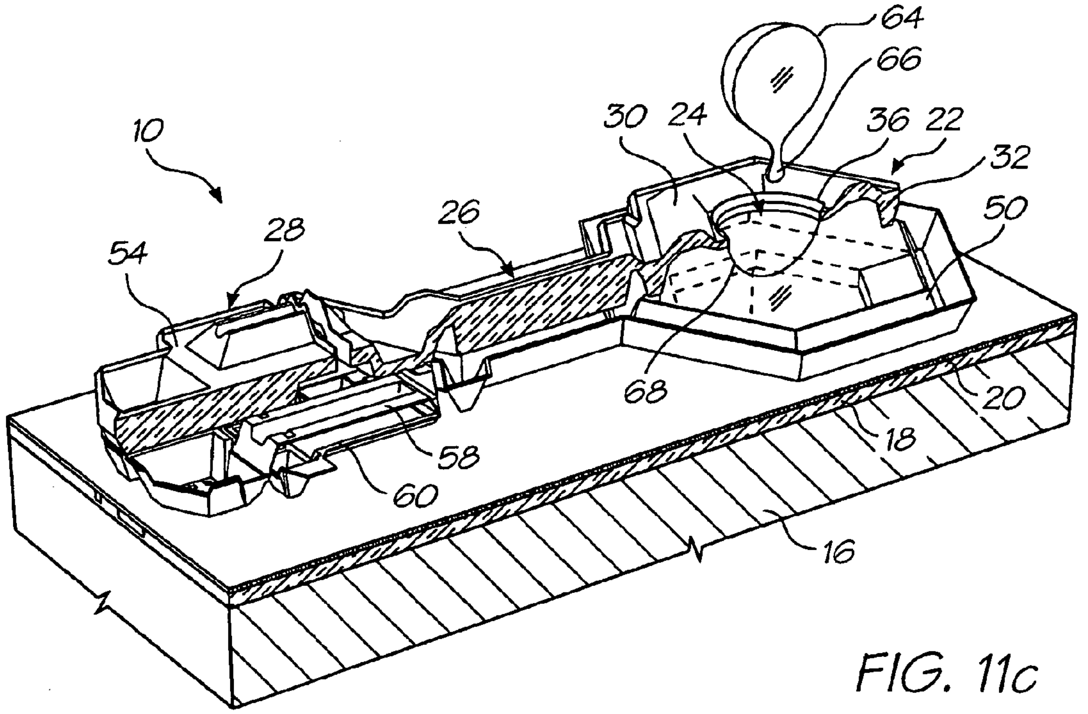
Figure 12C:
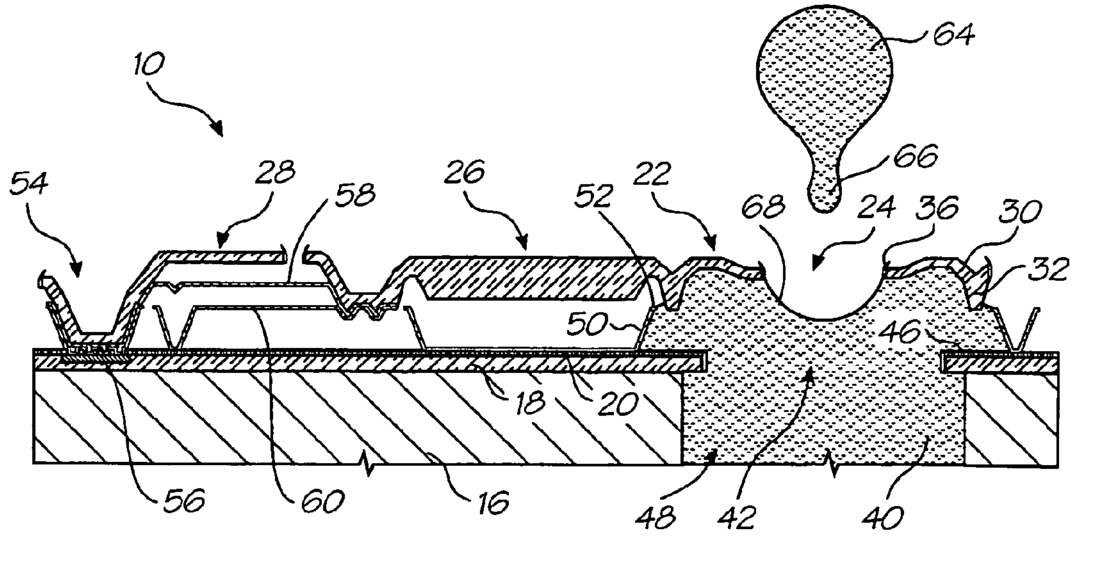

A further UV release tape (not shown) is applied to a rear of the wafer 16 and the tape 140 is removed. The sacrificial layers 108, 112, 120, 128 and 134 are stripped in oxygen plasma to provide the final nozzle assembly 10 as shown in FIGS. 8*r* and 9*r* of the drawings. For ease of reference, the reference numerals illustrated in these two drawings are the same as those in FIG. 1 of the drawings to indicate the relevant parts of the nozzle assembly 10. FIGS. 11 and 12 show the operation of the nozzle assembly 10, manufactured in accordance with the process described above with reference to FIGS. 8 and 9 and these figures correspond to FIGS. 2 to 4 of the drawings.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of manufacture of an ink jet printhead, the method including the steps of:

providing a substrate;

creating an array of nozzle assemblies on the substrate each with a nozzle chamber which has a nozzle portion defining a nozzle opening, the nozzle portion of each assembly being displaceable toward and away from the substrate for effecting ink ejection on demand; and interconnecting the nozzle portion with an actuator unit arranged externally of the nozzle chamber by means of an arm such that the nozzle portion is cantilevered with respect to the actuator unit to be displaced thereby.

2. The method of claim 1 which includes creating said array by using planar monolithic deposition, lithographic and etching processes.

3. The method of claim 1 which includes forming multiple printheads simultaneously on the substrate.

4. The method of claim 1 which includes forming integrated drive electronics on the same substrate.

5. The method of claim 4 which includes forming the integrated drive electronics using a CMOS fabrication process.

6. The method of claim 1 which includes forming a first part of a wall defining the chamber from a part of the nozzle and a second part of the wall from an inhibiting means, which inhibits leakage of ink from the chamber, the inhibiting means extending from the substrate.

7. The method of claim 1 in which the actuator unit is a thermal bend actuator, and in which the method includes forming the actuator from at least two beams, one being an active beam and the other being a passive beam.

* * * * *